US011175419B2

(12) United States Patent
Hathi et al.

(10) Patent No.: US 11,175,419 B2
(45) Date of Patent: Nov. 16, 2021

(54) BLAST RECONCILIATION FOR MINES

(71) Applicant: ACCENTURE GLOBAL SOLUTIONS LIMITED, Dublin (IE)

(72) Inventors: Bhudeep Hathi, Thane (IN); Vivek Vaidyanathan, Chennai (IN); Nasiruddin Mohammad, Hyderabad (IN); Sahil A. Raj, Arrah (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 681 days.

(21) Appl. No.: 16/022,115

(22) Filed: Jun. 28, 2018

(65) Prior Publication Data

US 2020/0003919 A1    Jan. 2, 2020

(51) Int. Cl.
| | |
|---|---|
| *G01V 1/108* | (2006.01) |
| *E21F 17/18* | (2006.01) |
| *F42D 1/00* | (2006.01) |
| *F42D 3/04* | (2006.01) |

(52) U.S. Cl.
CPC ............... *G01V 1/108* (2013.01); *E21F 17/18* (2013.01); *F42D 1/00* (2013.01); *F42D 3/04* (2013.01); *G01V 2210/121* (2013.01); *G01V 2210/1299* (2013.01); *G01V 2210/612* (2013.01); *G01V 2210/64* (2013.01)

(58) Field of Classification Search
CPC .. E21C 37/16; E21F 17/18; F42D 1/00; F42D 3/04; G01V 1/108; G01V 2210/121; G01V 2210/1299; G01V 2210/612; G01V 2210/64; G01V 99/005; G06N 20/00; G06N 5/003; G06N 5/04; G06Q 10/04; G06Q 10/06393; G06Q 50/02; E21B 47/00
See application file for complete search history.

(56) References Cited

U.S. PATENT DOCUMENTS

| | | | |
|---|---|---|---|
| 2015/0134315 A1* | 5/2015 | Sarmiento | G16B 35/20 703/11 |
| 2018/0075175 A1* | 3/2018 | Chang | G06F 17/18 |
| 2020/0089823 A1* | 3/2020 | Hunt | G01V 99/005 |

FOREIGN PATENT DOCUMENTS

WO    2009/109006    9/2009

OTHER PUBLICATIONS

SpikeVM, Bulking Swell of Excavated or Mined Materials, Dec. 10, 2017 (Year: 2017).*

(Continued)

*Primary Examiner* — Kyle R Quigley
(74) *Attorney, Agent, or Firm* — Mannava & Kang, P.C.

(57) ABSTRACT

According to an example, with respect to blast reconciliation for mines, pre blast measurement data and post blast measurement data associated with a blasting operation for a mining site may be ascertained from a pre and post blast measurer. A blast reconciliation model may be generated using existing pre blast measurement data and existing post blast measurement data, and used to analyze the ascertained pre blast measurement data and the ascertained post blast measurement data. Based on the analysis of the ascertained pre blast measurement data and the ascertained post blast measurement data, a blast material yield for the mining site may be determined as a result of the blasting operation. An alert indicative of the blast material yield may be generated.

18 Claims, 18 Drawing Sheets

(56) References Cited

OTHER PUBLICATIONS

Dyno Nobel, Blasting and Explosives Quick Reference Guide, 2010 (Year: 2010).*

Anonymous: "Using Machine Learning to Make Blasting Design Cheaper, Faster, and More Intelligent", May 21, 2018, 3 pages. <https://blog.strayos.com/using-machine-learning/>.

Craig Morley et al., "Mine value chain reconciliation-demonstrating value through best practice", 10th International Mining Geology Conference, Sep. 20, 2017, pp. 279-292.

Anonymous: "Cost saving in Drill and Blasting with Machine Learning", Jun. 7, 2018, 7 pages. <https://blog.strayos.com/cost-saving-in-drill-and-blasting-with-machine-learning/>.

* cited by examiner

1400

```
ASCERTAIN, FROM A PRE AND POST BLAST MEASURER, PRE BLAST
MEASUREMENT DATA AND POST BLAST MEASUREMENT DATA
ASSOCIATED WITH A BLASTING OPERATION FOR A MINING SITE
1402
```

```
GENERATE, USING EXISTING PRE BLAST MEASUREMENT DATA AND
EXISTING POST BLAST MEASUREMENT DATA, A BLAST
RECONCILIATION MODEL
1404
```

```
ANALYZE, USING THE BLAST RECONCILIATION MODEL, THE
ASCERTAINED PRE BLAST MEASUREMENT DATA AND THE
ASCERTAINED POST BLAST MEASUREMENT DATA
1406
```

```
DETERMINE, BASED ON THE ANALYSIS OF THE ASCERTAINED PRE
BLAST MEASUREMENT DATA AND THE ASCERTAINED POST BLAST
MEASUREMENT DATA, A BLAST MATERIAL YIELD FOR THE MINING
SITE AS A RESULT OF THE BLASTING OPERATION
1408
```

```
GENERATE, AN ALERT INDICATIVE OF THE BLAST MATERIAL YIELD
1410
```

```
CONTROL, BASED ON THE ALERT, A MINING OPERATION ASSOCIATED
WITH THE MINING SITE
1412
```

*FIG. 14*

BLAST RECONCILIATION FOR MINES

BACKGROUND

In environments such as underground mining environments, a blasting operation may be used to extract raw material. In order to determine how much raw material may be extracted for a particular blast, pre and post blast advances on a mine face may be analyzed. Further, a "survey" technique that includes a volumetric survey of a blast zone may be performed to estimate the amount of extracted raw material. In this regard, a "spot" technique may also be used, for example, by counting a number of vehicles or containers, that are used to remove the raw material.

BRIEF DESCRIPTION OF DRAWINGS

Features of the present disclosure are illustrated by way of examples shown in the following figures. In the following figures, like numerals indicate like elements, in which

FIG. 14 illustrates a flowchart of a method for blast reconciliation for mines, according to an example of the present disclosure.

DETAILED DESCRIPTION

Figure 1:
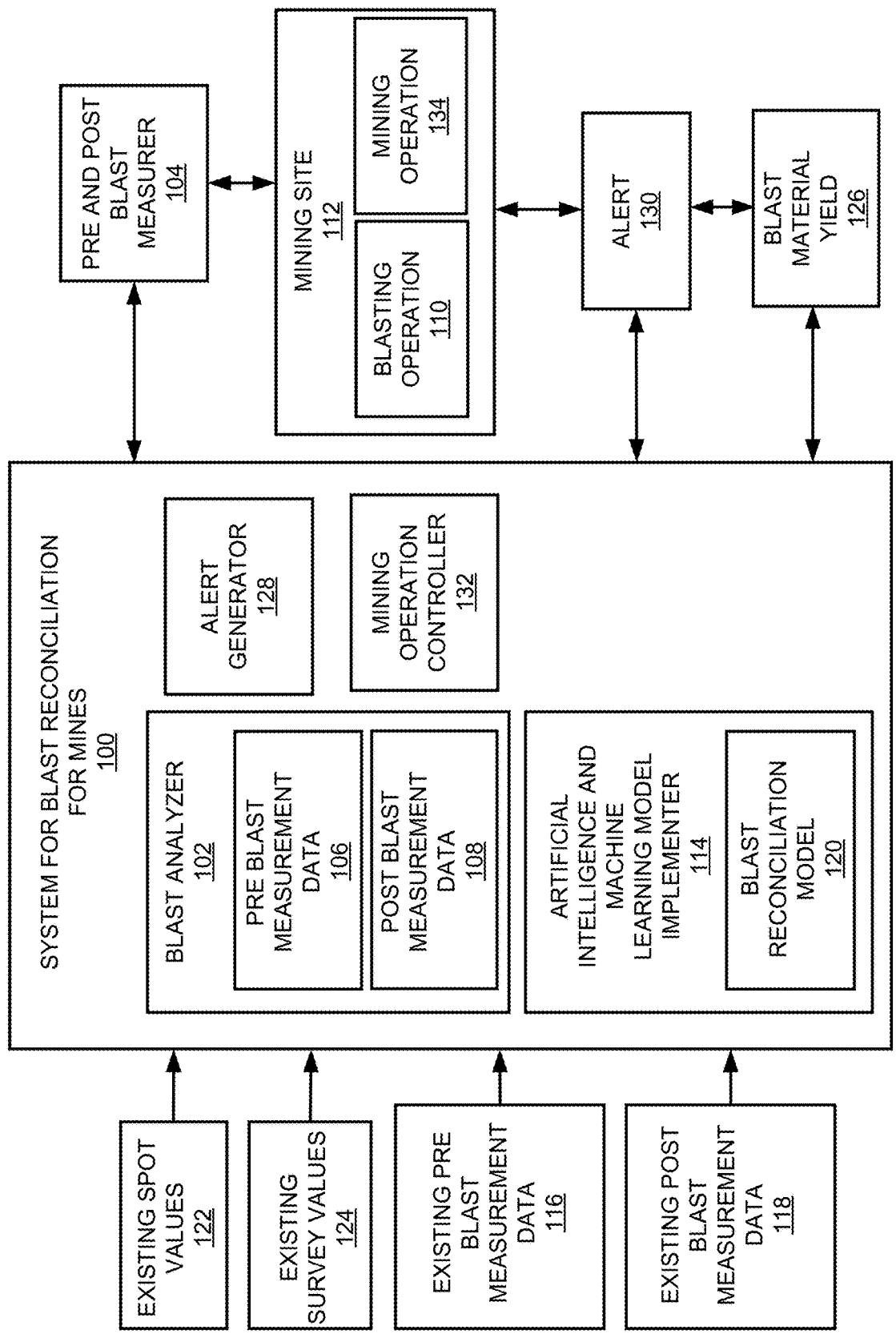
FIG. 1 illustrates an architecture of a system for blast reconciliation for mines, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Systems for blast reconciliation for mines, methods for blast reconciliation for mines, and non-transitory computer readable media having stored thereon machine readable instructions for blast reconciliation for mines are disclosed herein. The systems, methods, and non-transitory computer readable media disclosed herein provide an accurate blasted material yield tonnage, in near real time, that may potentially affect an entire supply chain of mine production capabilities for operations such as mining operations that may include underground mining operations. The systems, methods, and non-transitory computer readable media disclosed herein provide for accurate tonnage measurement and advance of a mine face in an underground mine during pre and post blast readings in a mining cycle.

As disclosed herein, in environments such as underground mining environments, a blasting operation may be used to extract raw material. In order to determine how much raw material may be extracted for a particular blast, pre and post blast advances on a mine face may be analyzed. Further, a "survey" technique that includes a volumetric survey of a blast zone may be performed to estimate the amount of extracted raw material. In this regard, a "spot" technique may also be used, for example, by counting a number of vehicles or containers that are used to remove the raw material. The amount of raw material extracted from a mine may vary significantly between the "survey" technique and the "spot" technique. Moreover, the "survey" technique and the "spot" technique may be implemented on a periodic basis, such as, monthly, bimonthly, etc. In this regard, it is technically challenging to efficiently and accurately reconcile the differences between the "survey" technique and the "spot" technique. That is, it is technically challenging to efficiently and accurately determine the amount of raw material that may be extracted for a particular blast. It is also technically challenging to efficiently and accurately determine the amount of raw material that may be extracted for a particular blast on a real-time basis.

In order to address at least the aforementioned technical challenges, the systems, methods, and non-transitory computer readable media disclosed herein may implement technologies to facilitate near real-time blast reconciliation monitoring by an underground mining organization to provide an accurate accounting view of materials handled. The blast reconciliation results may be used to derive strategic and operational insights, model behavior, and to make predictions for future production targets. Further, the blast reconciliation results may be used to generate a framework to utilize the recording, ingestion, and collection of data from blasting operations as inputs for mine planning, geology, surveying, engineering, and seismic analysis for reporting and visualization purposes.

According to examples disclosed herein, the systems, methods, and non-transitory computer readable media disclosed herein may provide a digital terrain view of an operations site on a mobility platform (e.g., utilizing a blast reconciliation mobile application as disclosed herein). The mobility platform may be integrated with handheld recording devices that provide for accurate, real-time capture, and transmission of field level, underground readings and measurements, providing deep visibility, improved traceability, accurate recordings at various stages, and realms of data sets for analytics and prediction models.

According to examples disclosed herein, the components of the systems, methods, and non-transitory computer readable media disclosed herein may be scalable with the addition of modules to incorporate other job-roles, to incorporate any number of devices, and may represent a comprehensive digital mining platform that executes at a mining site.

According to examples disclosed herein, the systems, methods, and non-transitory computer readable media disclosed herein may provide a reliable, accurate, and remotely enabled (e.g., via and hand-held laser device as disclosed herein) mechanism for pre and post blast readings to be made available, with calculations, for reconciling between the 'spot' and 'survey' values. This reconciliation between the 'spot' and 'survey' values may reduce losses due to inaccurately reported data on material handled. These readings may be automatically transferred via the blast reconciliation mobile application to a Cloud platform for storage and further analysis.

According to examples disclosed herein, the systems, methods, and non-transitory computer readable media disclosed herein may utilize blasted material data taken at various points, and for different mines over a time-period, to generate an artificial intelligence model (e.g., a blast reconciliation model as disclosed herein) to further reduce, optimize, and predict deviations, and sampling errors in the calculations.

In some examples, the systems, methods, and non-transitory computer readable media disclosed herein may include a pre and post blast measurer, which may be in the form of a handheld laser device to obtain readings. For example, the handheld laser device may utilize an integrated hand-held BOSCH device setup. The readings may include, for example, pre and post blast material excavated. For example, a pre blast material reading may be determined as a length (e.g., xm) from a reference location marked on the sidewalls of a mining site. A post blast material reading may also be determined as a length (e.g., y m) from the reference location. The post blast material reading may also include a cross-sectional area (e.g., a m$^2$), where the cross-sectional area may be determined as a function of a height and width associated with the blast area of the mining site. Thus, a rate of advance may be determined as y–x, and a tonnage of material handled may be determined as a X (rate of advance) X (bulk deck density of material). A plurality of readings may be taken and averaged to avoid anomalous readings.

In some examples, the systems, methods, and non-transitory computer readable media disclosed herein may be integrated into a mobile based application platform (e.g., the blast reconciliation mobile application as disclosed herein) to relay data, for example, to the Cloud. For example, the mobile based application platform may provide for data transfer from the pre and post blast measurer to the Cloud.

In some examples, the systems, methods, and non-transitory computer readable media disclosed herein may include a blast analyzer for continuous data ingestion, learning, and feedback into a blast reconciliation model for analysis by artificial intelligence and machine learning as disclosed herein. In this regard, the blast analyzer may be developed on PYTHON for the continuous data ingestion, learning, and feedback.

In some examples, the systems, methods, and non-transitory computer readable media disclosed herein may include an artificial intelligence and machine learning model implementer to generate the blast reconciliation model, where an integration layer may be developed on PYTHON to analyze data.

In some examples, the systems, methods, and non-transitory computer readable media disclosed herein may include analytics to customize the blast reconciliation model, and to identify fits for ingested data. Examples of models that may be utilized for the blast reconciliation model may include time-series models, Chi-square, etc., to analyze data, study variations and deviations, and to recognize patterns.

In some examples, the systems, methods, and non-transitory computer readable media disclosed herein may include an alert generator to provide an alerts framework for displaying and reporting of data into a console/dashboard in real time.

In some examples, the systems, methods, and non-transitory computer readable media disclosed herein may include a mining operation controller to control, based, for example, on the determination of blast material yield as disclosed herein, and/or an alert generated by the alert generator, a mining operation with respect to a subject mining site. Examples of a mining operation may include an operation related to removal of raw material, personnel management, material processing facilities, and generally, any operation related to a mining site that may be affected by the presence, or the lack of presence of material at a mining site.

With respect to the aforementioned components of the systems, methods, and non-transitory computer readable media disclosed herein, a blast reconciliation operation may include conducting of a survey, using the pre and post blast measurer, for pre and post blast movement. Thereafter, the blast analyzer may analyze the data acquired with respect to each survey. The artificial intelligence and machine learning model implementer may perform analysis with respect to deviations in material tonnage values determined using the spot technique, a survey technique, and the blast reconciliation technique disclosed herein. Based on any discrepancies between these aforementioned tonnage determination techniques, the alert generator may generate an appropriate alert. For example, an alert may include an indication of a low quantity of raw material, which may require a reduction in a number of vehicles specified for removal of the raw material, or vice versa, where a high quantity of raw material may require an increase in a number of vehicles specified for removal of the raw material. From a safety perspective, an alert may include an indication of a higher than planned raw material generation due to a blast operation, which may affect the integrity of a mind. Generally, an alert may include any indication specified as a result of a blast operation.

According to examples disclosed herein, for the systems, methods, and non-transitory computer readable media disclosed herein, immediate, near real-time blast yield values may be recorded electronically.

According to examples disclosed herein, for the systems, methods, and non-transitory computer readable media disclosed herein, near real-time blasting data that has earlier possibly never been recorded may be captured with stope, face, level, shift details, and other such attributes.

According to examples disclosed herein, for the systems, methods, and non-transitory computer readable media disclosed herein, since blasting data capture at the source may be pivotal to how much 'ore yield' is extracted in mining operations, the impact of having accurate readings and measurements may provide a downstream impact all the way in the mining value chain, from production to accounting to health, safety and environment.

According to examples disclosed herein, for the systems, methods, and non-transitory computer readable media disclosed herein, data capture at the source may provide a key benefit to mine planners, geologists, surveyors, operations engineers, production, and maintenance personnel. In this regard, the systems, methods, and non-transitory computer readable media disclosed herein may provide a real-time, accurate, non-tamperable, need-based, data-backed 'system of record', which may provide for digitization with respect to mining operations.

According to examples disclosed herein, the systems, methods, and non-transitory computer readable media disclosed herein provide for determination of the tonnage from the volume with respect to a blast, by measuring the accurate cross-section of the sectional area in the underground mine.

According to examples disclosed herein, the systems, methods, and non-transitory computer readable media disclosed herein may implement an artificial intelligence model framework to analyze the data gathered using statistical models to provide predictions for future use, variances from the standard, and identify patterns from historical data, among others.

According to examples disclosed herein, the systems, methods, and non-transitory computer readable media disclosed herein may provide extendibility to cover different use-cases along the mining value chain, with reconciliation of blast operations being an example as disclosed herein. For example, the systems, methods, and non-transitory computer readable media disclosed herein may be extended to cover use-cases such as volumetric surveys, stockpile monitoring, inventory management, tailings management, blast fragmentation and heave, particle size analysis, mine planning, geological analysis, and other such cases.

According to examples disclosed herein, the systems, methods, and non-transitory computer readable media disclosed herein may provide excavated rock mass measurements and rate of advance of underground slopes.

According to examples disclosed herein, the systems, methods, and non-transitory computer readable media disclosed herein may provide volumetric survey for drivages in underground mines and tunnels.

According to examples disclosed herein, the systems, methods, and non-transitory computer readable media disclosed herein may provide a forecasting and variability model (e.g., the blast reconciliation model as disclosed herein) using machine learning to determine blasting resources requirements such as explosives, crew size, etc.

According to examples disclosed herein, the systems, methods, and non-transitory computer readable media disclosed herein may provide key performance indicators such as accuracy of projection, per day rate of development, time interval of reconciliation, cost per ton of material, output per worker per shift, etc.

In some examples, elements of the system for blast reconciliation for mines may be machine readable instructions stored on a non-transitory computer readable medium. In this regard, the system for blast reconciliation for mines may include or be a non-transitory computer readable medium. In some examples, the elements of the system for blast reconciliation for mines may be hardware or a combination of machine readable instructions and hardware.

FIG. 1 illustrates an architecture of a system for blast reconciliation for mines 100 (hereinafter "system 100"), according to an example of the present disclosure.

Referring to FIG. 1, the system 100 may include a blast analyzer 102 that is executed by at least one hardware processor (e.g., the hardware processor 1302 of FIG. 13, and/or the hardware processor 1504 of FIG. 15) to ascertain, from a pre and post blast measurer 104, pre blast measurement data 106 and post blast measurement data 108 associated with a blasting operation 110 for a mining site 112.

According to examples disclosed herein, the pre and post blast measurer 104 may include a laser device to ascertain the pre blast measurement data 106 that includes a pre blast length measurement from a reference location of the mining site 112 to a surface of the mining site (e.g., a surface that will be impacted by the blasting operation 110) prior to commencement of the blasting operation 110. Further, the pre and post blast measurer 104 may ascertain the post blast measurement data 108 that includes a post blast length measurement from the reference location of the mining site 112 to another surface of the mining site 112 (e.g., the surface that remains) after completion of the blasting operation 110, and a blast area associated with the other surface of the mining site 112 after the completion of the blasting operation 110.

According to examples disclosed herein, the blast analyzer 102 may ascertain, from the pre and post blast measurer 104, the pre blast measurement data 106 and the post blast measurement data 108 associated with the blasting operation 110 for the mining site 112 by ascertaining, from a Cloud database (not shown) that is to receive the pre blast measurement data 106 and the post blast measurement data 108 from the pre and post blast measurer 104, the pre blast measurement data 106 and the post blast measurement data 108 associated with the blasting operation 110 for the mining site 112.

An artificial intelligence and machine learning model implementer 114 that is executed by at least one hardware processor (e.g., the hardware processor 1302 of FIG. 13, and/or the hardware processor 1504 of FIG. 15) may generate, using existing pre blast measurement data 116 and existing post blast measurement data 118, a blast reconciliation model 120. For example, the existing pre blast measurement data 116 and the existing post blast measurement data 118 may be specified for a time period such as 30 days, 90 days, etc.

According to examples disclosed herein, the artificial intelligence and machine learning model implementer 114 may generate, using the existing pre blast measurement data 116 and the existing post blast measurement data 118, the blast reconciliation model 120 by implementing the blast reconciliation model 120 utilizing artificial intelligence and machine learning, and utilizing the artificial intelligence and the machine learning of the blast reconciliation model 120 to analyze the existing pre blast measurement data 116 and the existing post blast measurement data 118.

According to examples disclosed herein, the artificial intelligence and machine learning model implementer 114 may generate, using the existing pre blast measurement data 116 and the existing post blast measurement data 118, the blast reconciliation model 120 by generating, using existing spot values 122 associated with blasting operations for a specified time duration (e.g., 30 days, 90 days, etc.), existing survey values 124 associated with the blasting operations for the specified time duration, the existing pre blast measurement data 116 associated with the blasting operations for the specified time duration, and the existing post blast measurement data 118 associated with the blasting operations for the specified time duration, the blast reconciliation model 120.

According to examples disclosed herein, the artificial intelligence and machine learning model implementer 114 may generate, using the existing pre blast measurement data 116 and the existing post blast measurement data 118, the blast reconciliation model 120 by utilizing, for the blast reconciliation model 120, a time series model to predict a production output value for blast material for a specified future date (e.g., 15 days from a current date).

According to examples disclosed herein, the artificial intelligence and machine learning model implementer 114 may utilize, for the blast reconciliation model 120, the time series model to predict the production output value for blast material for the specified future date by utilizing, for the blast reconciliation model 120, a linear time series model, and determining, for the linear time series model, Akaike information criterion (AIC) values and Bayesian information criterion (BIC) values. The artificial intelligence and machine learning model implementer 114 may identify, from the determined AIC and BIC values, smallest AIC and BIC values. Further, the artificial intelligence and machine learning model implementer 114 may utilize the determined smallest AIC and BIC values to predict the production output value for blast material for the specified future date.

According to examples disclosed herein, the artificial intelligence and machine learning model implementer 114 may generate, using the existing pre blast measurement data 116 and the existing post blast measurement data 118 the blast reconciliation model 120 by determining, for the blast reconciliation model 120, a variance between predicted and observed production output values for blast material.

The artificial intelligence and machine learning model implementer 114 may analyze, using the blast reconciliation model 120, the ascertained pre blast measurement data 106 and the ascertained post blast measurement data 108, and determine, based on the analysis of the ascertained pre blast measurement data 106 and the ascertained post blast measurement data 108, a blast material yield 126 for the mining site 112 as a result of the blasting operation 110.

According to examples disclosed herein, the artificial intelligence and machine learning model implementer 114 may analyze, using the blast reconciliation model 120, the ascertained pre blast measurement data 106 and the ascertained post blast measurement data 108 by tuning the blast reconciliation model 120, and determining a fit of the ascertained pre blast measurement data 106 and the ascertained post blast measurement data 108 to the tuned blast reconciliation model 120.

An alert generator 128 that is executed by at least one hardware processor (e.g., the hardware processor 1302 of FIG. 13, and/or the hardware processor 1504 of FIG. 15) may generate an alert 130 indicative of the blast material yield 126, or other alerts associated with the blasting operation 110, and/or the mining site 112.

A mining operation controller 132 that is executed by at least one hardware processor (e.g., the hardware processor 1302 of FIG. 13, and/or the hardware processor 1504 of FIG. 15) may control, based on the alert 130, a mining operation 134 associated with the mining site 112.

Operation of the system 100 is described in further detail with reference to FIGS. 1-12.

With respect to blast reconciliation, a mine call factor may be defined as a ratio of the sum of material produced in recovery and residue divided by material called for by mines calculations and evaluations. Theoretically, if sampling, assaying, and tonnage measurements in a mine are accurate, and there is no material lost at any stage during handling and processing, then the mine call factor should be 100%. In this regard, shortfalls and excesses may represent tonnage discrepancies which should balance out over time. Thus, the mine call factor may establish the efficiency of an operation with the calculated tonnage. Reconciliation of the yield values with theoretical projections may allow input measurements to be equal to output measurements.

Figure 2:
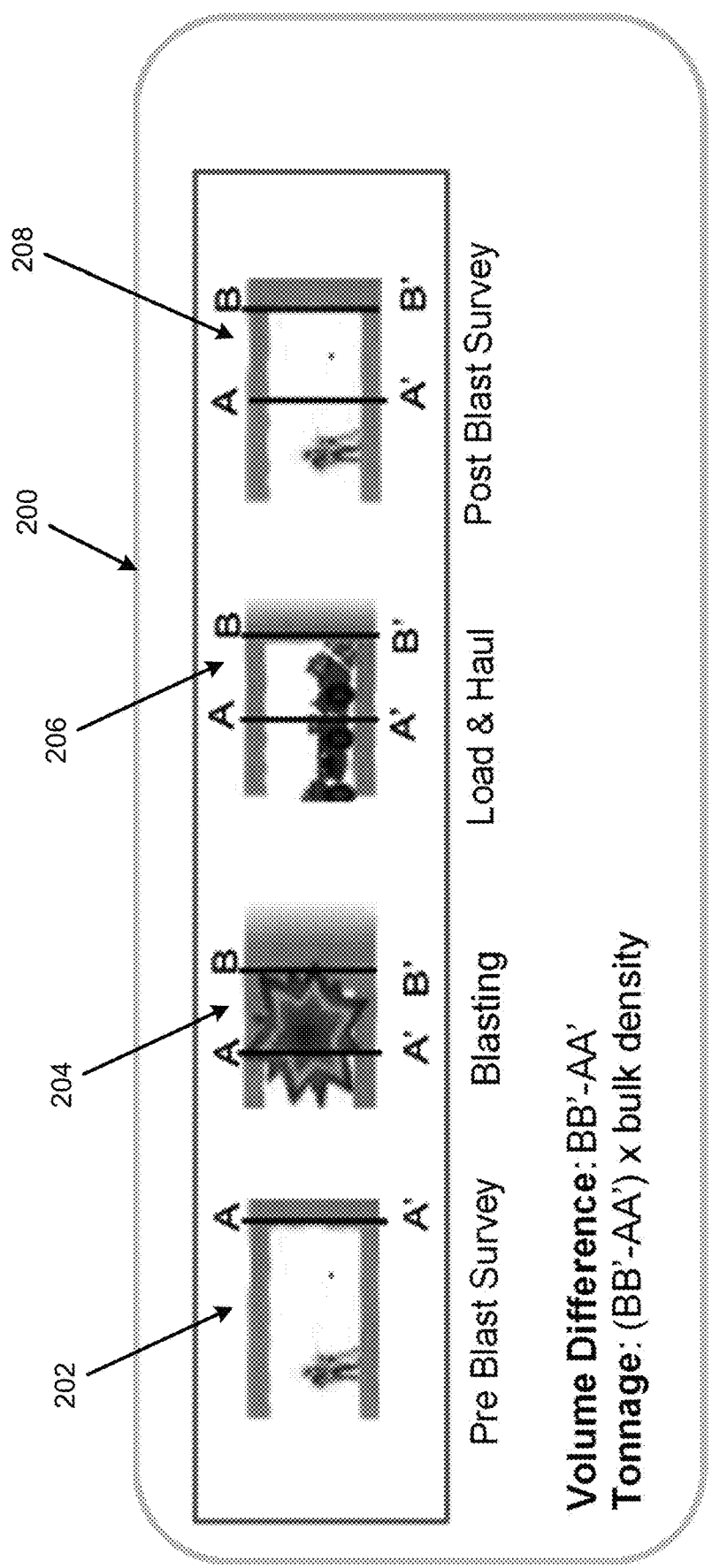
FIG. 2 illustrates survey based tonnage estimation to illustrate operation of the system of FIG. 1, according to an example of the present disclosure.

FIG. 2 illustrates a survey based tonnage estimation 200 to illustrate operation of the system 100, according to an example of the present disclosure.

Referring to FIG. 2, the survey based tonnage estimation 200 may be performed by conducting a pre blast survey at 202, with a blasting operation being performed at 204, loading and removal of extracted material being performed at 206, and a post blast survey being conducted at 208. In this regard, the volume difference may be represented as BB'−AA'. Further, a tonnage estimation may be performed as follows: (BB'−AA') X bulk density, where the bulk density may represent the density of the extracted material.

Figure 3:
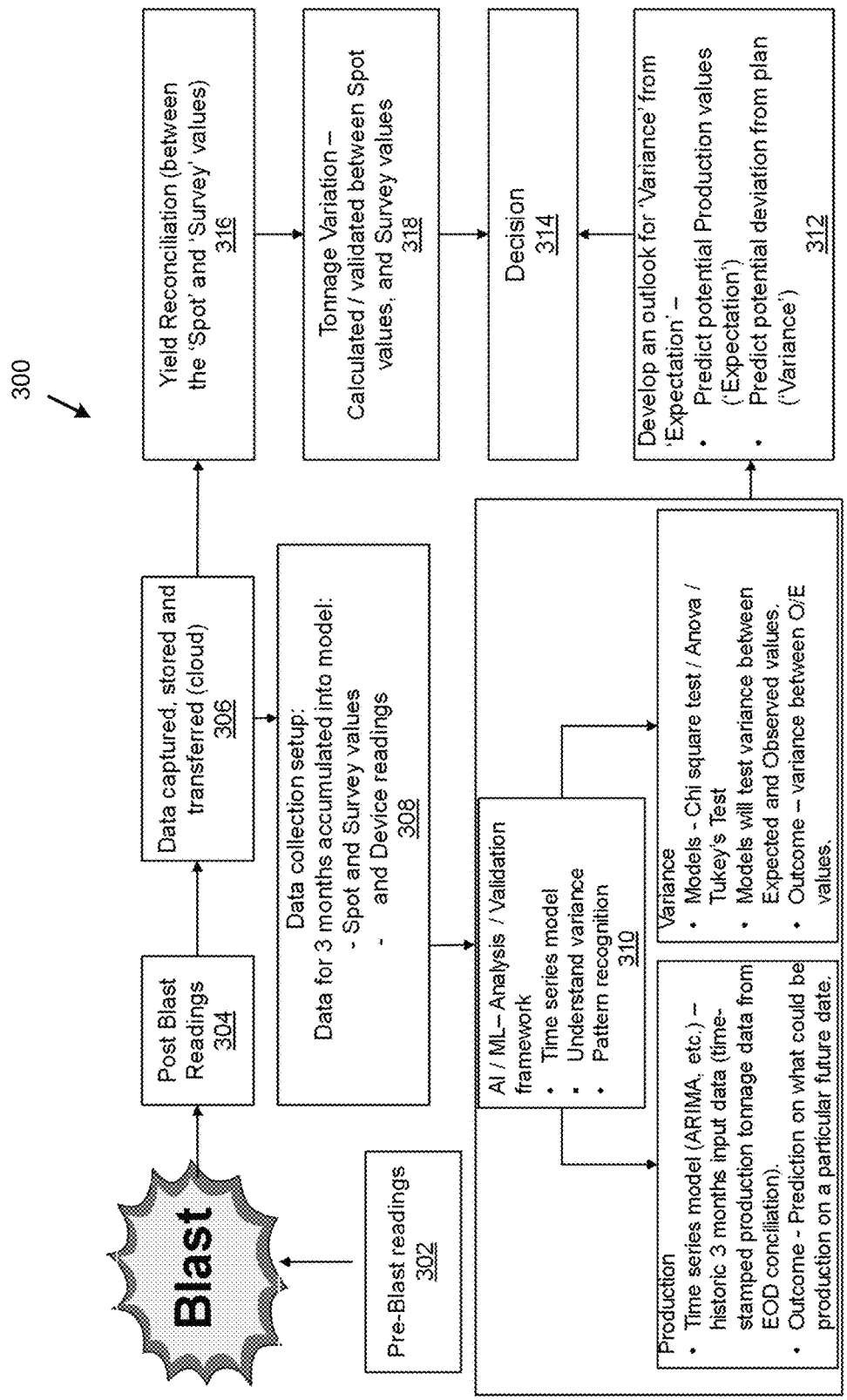
FIG. 3 illustrates a logical flow for blast reconciliation to illustrate operation of the system of FIG. 1, according to an example of the present disclosure.

FIG. 3 illustrates a logical flow 300 for blast reconciliation to illustrate operation of the system 100, according to an example of the present disclosure.

Referring to FIG. 3, at blocks 302 and 304, the pre and post blast measurer 104 may respectively perform a pre blast reading (e.g., to ascertain pre blast measurement data 106) and a post blast reading (e.g., to ascertained post blast measurement data 108) of the mining site 112.

At block 306, the pre and post blast measurer 104 may capture pre blast measurement data 106 and post blast measurement data 108 with respect to the pre blast reading and the post blast reading. Further, at block 306, the pre blast measurement data 106 and the post blast measurement data 108 may be transferred, for example, to a cloud environment.

At block 308, the blast analyzer 102 may accumulate data from block 306 for the blast reconciliation model 120. In this regard, the data may include data from a plurality of months. For example, the data may include data from three months. The data may include spot and survey values with respect to the mining site 112 (and/or other mining sites), and as well as the pre blast reading and the post blast reading.

At block 310, the artificial intelligence and machine learning model implementer 114 may generate the blast reconciliation model 120 based on a time series model, and may further perform variance analysis and pattern recognition. In this regard, with respect to production, the time series model may utilize, for example, three months of input data. The input data may be time stamped production tonnage data from end of day conciliation. An outcome with respect to the time series model may include a prediction on what may be the production on a future date. With respect to variance, models such as Chi square test, Anova, Tukey's test, etc., may be utilized for the blast reconciliation model 120. In this regard, the models may be used to test variance between expected (e.g., predicted) and observed values, and the outcome of the models may include a variance between expected and observed values.

With respect to variation, different ranges of variation may represent different causes, include a different impact, different processes, and different process impact areas associated with the mining site 112. For example, a variation of 0-3% may represent a very low impact, include potential causes that include boulders formation due to a blast, include a process that includes a blast, and a process impact that includes extraction of mineral. According to another example, a variation of 3-5% may represent a low impact, include potential causes of flying rocks, vehicle spillage, bulk density, etc., include a process that includes blast load and haul material, and include a process impact that includes extraction of mineral, monitoring and analyzing production performance and reconciliation, development of ore body knowledge, etc. Similarly, variations of 5-8% may represent a medium impact, 8-10% may represent a high impact, etc.

At block 312, the artificial intelligence and machine learning model implementer 114 may develop an outlook of variance from expectations. In this regard, the production outlook and its potential variance may be predicted by ingestion of historical data (e.g., at a minimum, 3-6 months of data may be utilized) into the artificial intelligence and machine learning model. With respect to the values obtained for that working area and fed to the model in block 310, with each execution, these values may produce improved outputs (through learning) with each iteration.

In this regard, the artificial intelligence and machine learning model implementer 114 may predict potential production values (e.g., expectation), and predict potential deviation from plan (e.g., variance).

At block 314, the artificial intelligence and machine learning model implementer 114 may generate/recommend a decision. Based on the outlook and the variance, a set of recommended actions may be triggered for respective job roles as an action item. The framework for predicting the variance and consequent actions may be configured and contextualized to the specific operational parameters. Therefore the rules and alerts may be setup accordingly, for example, for execution of block 1516 (e.g., FIG. 15) based on the prediction of potential production values, and the prediction of potential deviation from plan.

At block 316, the artificial intelligence and machine learning model implementer 114 may perform yield reconciliation. In this regard, the yield reconciliation may be performed between the spot and survey values. The output values from spot and survey in an ideal state should show relatively minimal to negligible variation, and any differences in values that are outside the existing standard margin of error may be deemed to be caused from tonnage discrepancies, due to inaccurate data collection, processing, analysis, and/or interpretation.

At block 318, the artificial intelligence and machine learning model implementer 114 may determine tonnage variation. In this regard, the tonnage variation may be determined and/or validated between spot values, and survey values.

With respect to the processing associated with blocks 300 to 318, the near real-time yield values may be recorded electronically. The blasting data with respect to block 302 and 304 may be captured in near real time, and recorded with respect to the stope, face, level, shift, and other such details.

Figure 4A:
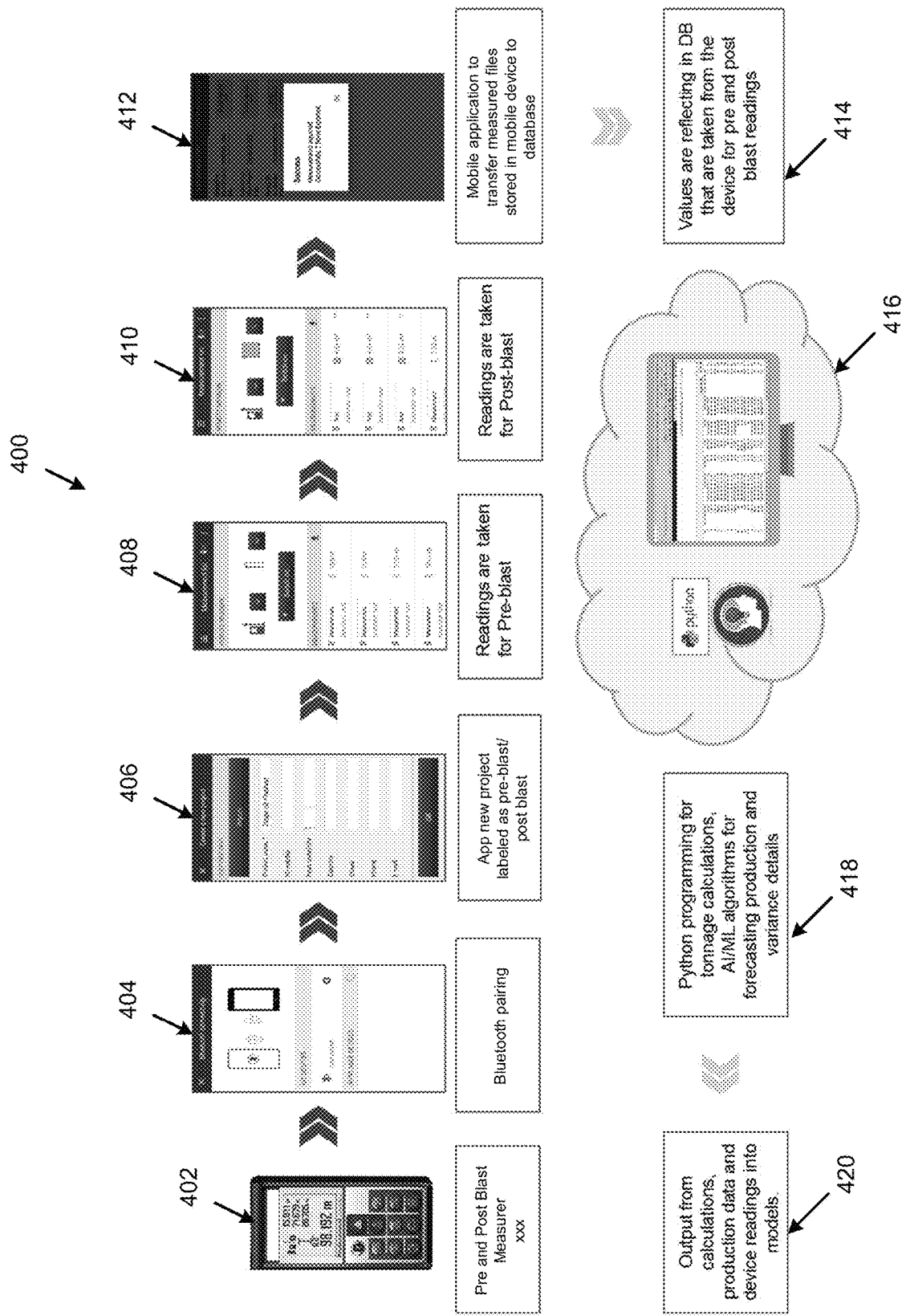
FIGS. 4A and 4B illustrate an execution flow for blast reconciliation to illustrate operation of the system of FIG. 1, according to an example of the present disclosure.
Figure 4B:
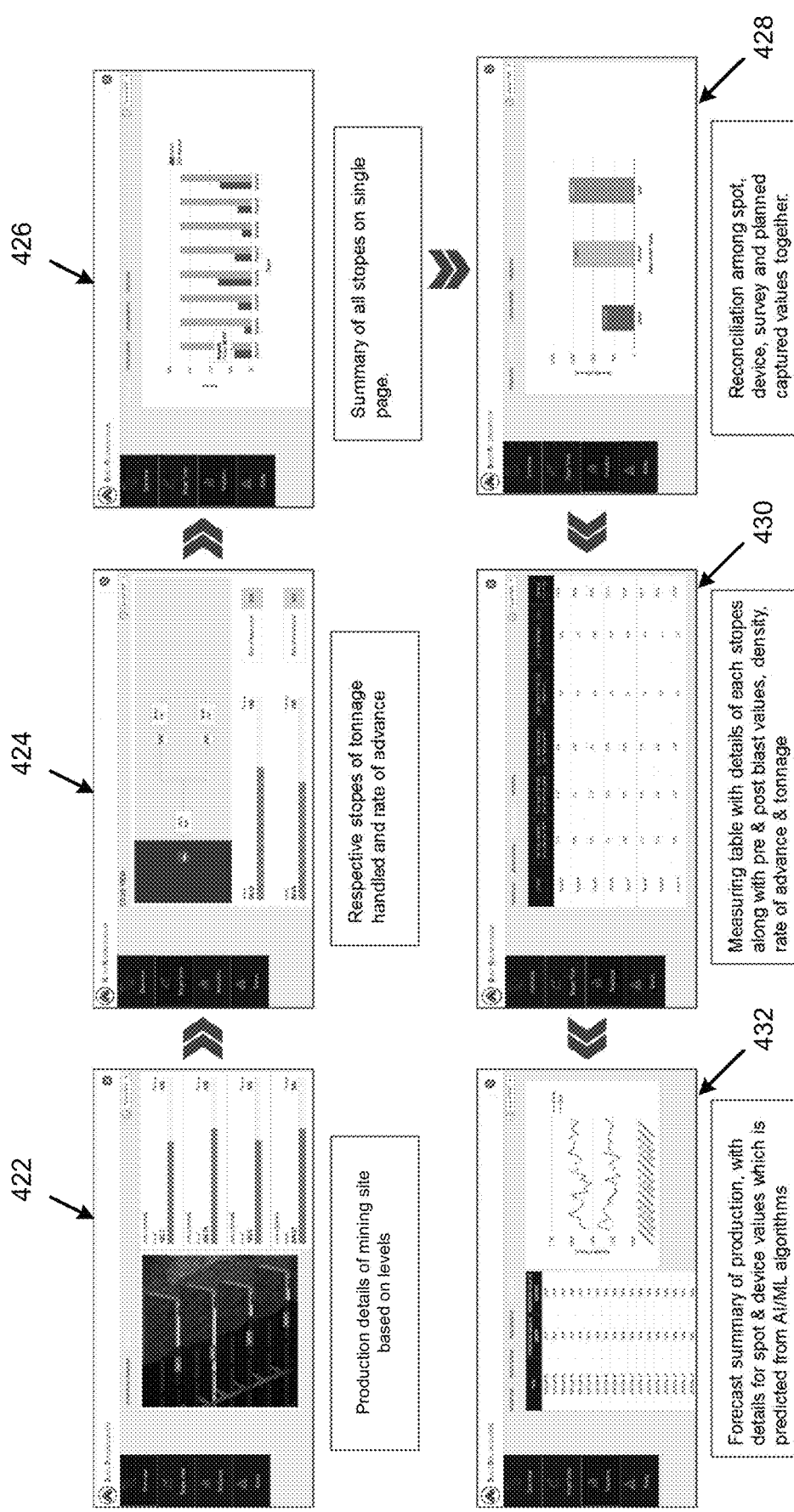

FIGS. 4A and 4B illustrate an execution flow 400 for blast reconciliation to illustrate operation of the system 100, according to an example of the present disclosure.

Referring to FIG. 4A, at 404, the pre and post blast measurer 104 at 402 may be paired with a mobile device using, for example, Bluetooth pairing.

A blast reconciliation mobile application 406 associated with the system 100 may be launched to create a new project designated, for example, pre blast and post blast.

At 408, the pre and post blast measurer 104 may perform pre blast readings at the mining site 112.

At 410, the pre and post blast measurer 104 may perform post blast readings at the mining site 112.

At 412, the blast reconciliation mobile application 406 associated with the system 100 may transfer data stored on the mobile device at 404 to the database, such as a Cloud database.

At 414, values that are taken from the pre and post blast measurer 104 may be reflected in the database.

At 416 and 418, Python programming for tonnage calculations may be performed. In this regard, the artificial intelligence and machine learning model implementer 114 may utilize artificial intelligence and machine learning techniques to forecast production and variance details as disclosed herein with respect to FIG. 3.

At 420, output from the various calculations performed with respect to block 418, production data, and readings from the pre and post blast measurer 104 may be entered into the blast reconciliation model 120.

Referring to FIG. 4B, at 422, the artificial intelligence and machine learning model implementer 114 may analyze production details of the mining site 112 based on levels. In mining, the term 'levels' may be used in underground mines to describe the different working surfaces in an underground operation. At regular intervals along a shaft, horizontal openings called drifts may be drilled inwards toward an ore body. Each such major working surface may be called a 'level'. An underground mine may contain hundreds of levels, and depending on operational complexity, each 'level' or working surface may be disposed at various depths underground.

For example, in FIG. 4B, block 422 may represent production figures that were captured using the system 100 for each level. Further, the artificial intelligence and machine learning model implementer 114 may enable analysis of production details, assuming that there is sufficient historical data available for production values. The artificial intelligence and machine learning model implementer 114 may analyze those values and provide a forecast for those values specific to that level from the underground mine.

At 424, the artificial intelligence and machine learning model implementer 114 may determine respective stopes of tonnage handled and rate of advance. A stope may be a term used in an underground metal mine. During the process of extracting the desired ore or other minerals from an underground mine, the open working space may be known as a stope. The material/ore/mineral excavated may be measured in metric units as tonnage, hence tonnage handled may thus be determined by the system 100 as disclosed herein.

At 426, a summary of all stopes may be displayed on a single page.

At 428, the artificial intelligence and machine learning model implementer 114 may perform reconciliation among spot, device, survey, and planned captured values. In this regard, reconciliation may include measuring the variance between at least two measuring points along a mining value chain sequence. For example, four tonnage values—spot tonnage, survey tonnage, readings may be taken from the system 100, and planned or expected tonnage may be ascertained according to a mine plan. At block 428, a graphical representation of those values may be displayed on a single graph to observe how close or varied the values from different sources are.

At 430, a measuring table with details of each stope may be displayed, along with pre and post blast values, material density, rate of advance, and tonnage. The tonnage may represent the blasted material yield, i.e., the amount of material/ore generated from the 'insitu' rocks by a blast operation.

At 432, the artificial intelligence and machine learning model implementer 114 may generate a summary of production with respect to the mining site 112. In this regard, details of the summary may include spot values, and device values predicted from the blast reconciliation model 120 implemented by the artificial intelligence and machine learning model implementer 114.

Figure 5:
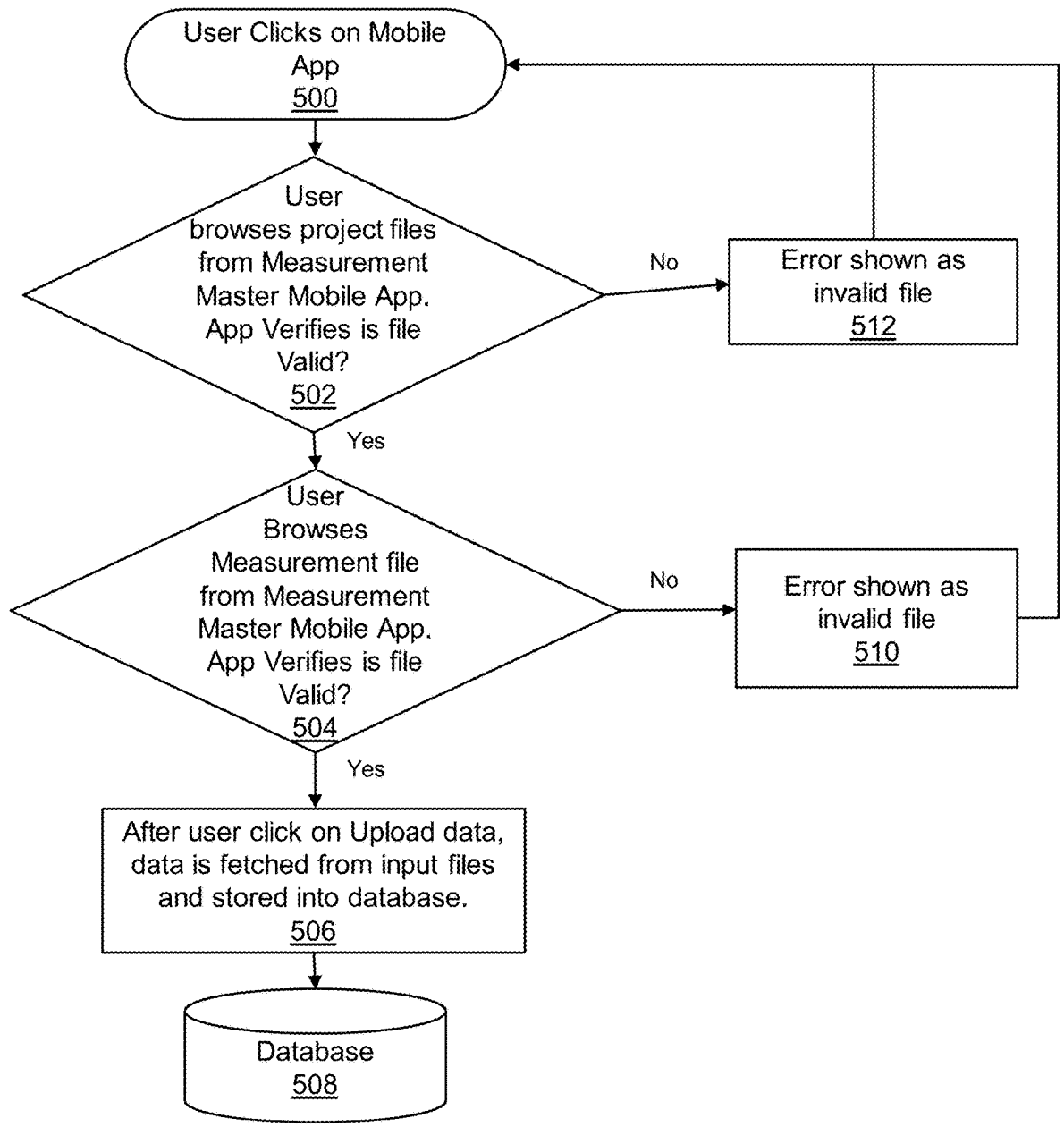
FIG. 5 illustrates a design layout of a blast reconciliation mobile application associated with the system of FIG. 1, according to an example of the present disclosure.

FIG. 5 illustrates a design layout of a blast reconciliation mobile application associated with the system 100, according to an example of the present disclosure. The flow of FIG. 5 may represent steps encountered in the blast reconciliation mobile application 406 associated with the system 100, where the mobile application may be implemented on a device such as a smart phone.

Referring to FIG. 5, at block 500, a user may launch the blast reconciliation mobile application 406 associated with the system 100 to perform blast reconciliation associated with a mining site 112.

At block 502, the user may browse project files from a measurement master mobile application, which may be a separate application from the blast reconciliation mobile application 406, or may be integrated within the blast reconciliation mobile application 406. The measurement master mobile application may verify whether the file is valid. The blast reconciliation mobile application 406 may read values from the measurement master application, and transfer the data to a SQL server database in a Cloud. Further, once the pre blast and post blast readings are taken from the pre and post blast measurer 104 at the mining site 112, and transferred to the blast reconciliation mobile application 406, the user may select a pre blast project file from the measurement master mobile application, and a post blast project file.

Based on a determination at block 502 that the file is valid, at block 504, the user may browse a measurement file from the measurement master mobile application. The measurement master mobile application may verify whether the file is valid. In this regard, the user may select the measurement file which is common to all projects. After selection of the project files, the user may upload all of the readings to a database, such as the Cloud database as disclosed herein. The readings may be maintained in a table format, and may be further processed to display results utilizing a web dashboard application.

Based on a determination at block 504 that the file is valid, at block 506, after the user click on upload data, data may be fetched from input files and stored into a database at 508.

Based on a determination at block 504 that the file is not valid, at block 510, an error may be displayed indicating that the file is invalid.

Based on a determination at block 502 that the file is not valid, at block 512, an error may be displayed indicating that the file is invalid.

Figure 6:
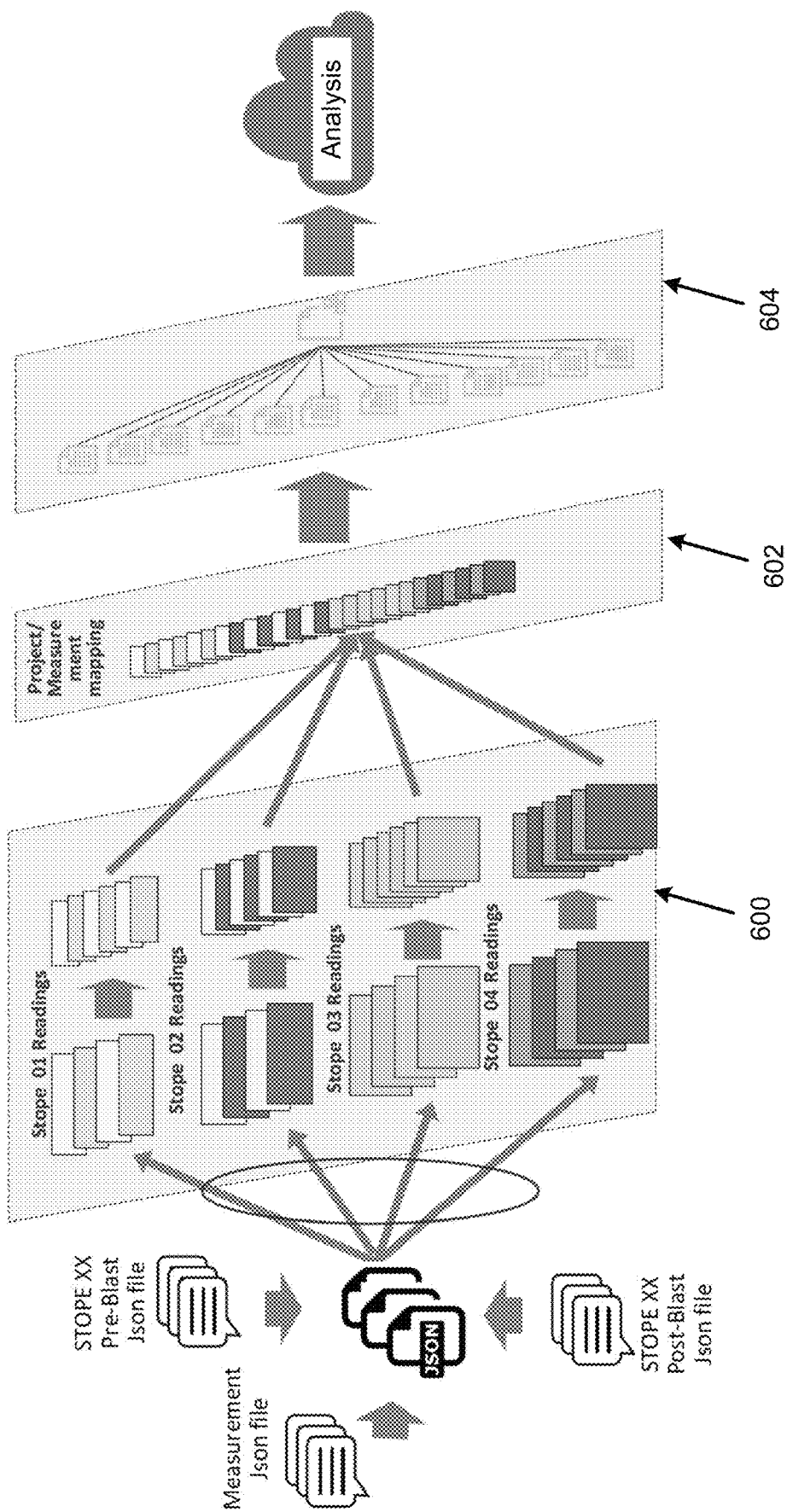
FIG. 6 illustrates further details of the design layout of the blast reconciliation mobile application of FIG. 4, according to an example of the present disclosure.

FIG. 6 illustrates further details of the design layout of the blast reconciliation mobile application of FIG. 5, according to an example of the present disclosure.

Referring to FIG. 6, the flow of FIG. 6 may represent steps encountered in the reading and processing of data with respect to the blast reconciliation mobile application 406.

At 600, files may be browsed from internal storage by the blast reconciliation mobile application 406. In this regard, files may include a stope pre blast file, a stope post blast file, and a measurement file, each of which may be in a JSON format.

At 602, mapping may be performed with respect to project and measurement files.

At 604, integration and transfer of data may be performed from the pre and post blast measurer 104 to a mobile device (e.g., as shown at 404). The storage capacity may represent a maximum theoretical possibility with respect to the mobile device.

Figure 7:
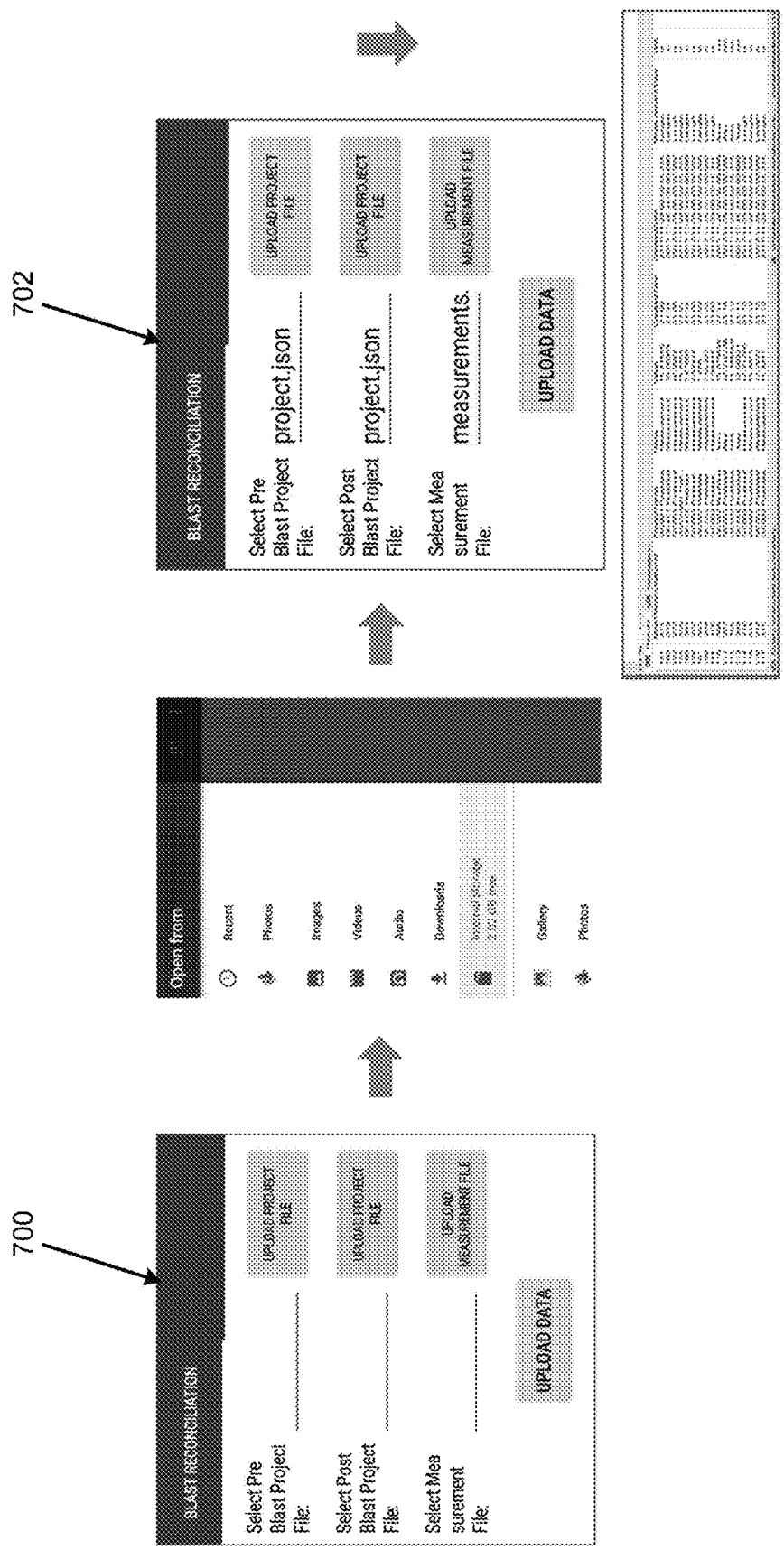
FIG. 7 illustrates further details of the design layout of the blast reconciliation mobile application of FIG. 4, according to an example of the present disclosure.

FIG. 7 illustrates further details of the design layout of the blast reconciliation mobile application of FIG. 5, according to an example of the present disclosure.

Referring to FIG. 7, with respect to the blast reconciliation mobile application 46, after a user captures information from the pre and post blast measurer 104, the pre and post blast measurer 104 may provide for transfer of the readings to a measurement master application. Each level of information may be stored as pre blast and post blast files in the measurement master application.

At 700, a user may select pre blast, post blast, and measurement file in the blast reconciliation mobile application 406. The blast reconciliation mobile application 406 may capture all of the information from the measurement file, and prepare the data in the proper format as shown at 702. In this regard, a user may prompt the data to be uploaded to the database.

Figure 8:
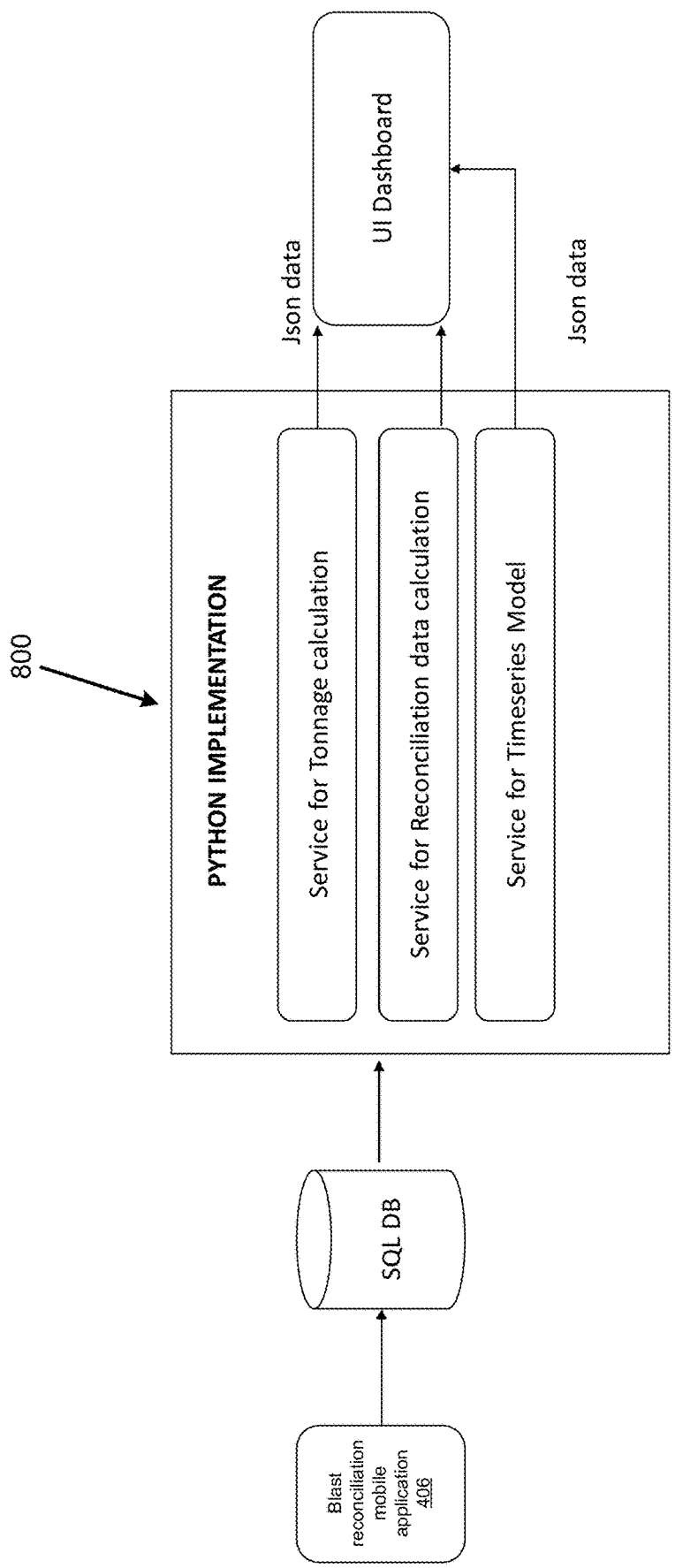
FIG. 8 illustrates details of tonnage determination to illustrate operation of the system of FIG. 1, according to an example of the present disclosure.

FIG. 8 illustrates details of tonnage determination to illustrate operation of the system 100, according to an example of the present disclosure.

Referring to FIG. 8, according to examples disclosed herein, at 800, a Python model may be designed for determining tonnage and other values. For example, with respect to the utilization of the Python model, a Flask service may be used to read data from a SQL Server using a Pyodbc library, to perform calculations, and to return data in a JSON format, as shown in a user interface database. The Python services may also be used to analyze historic reconciliation data for spot and device values, and for performing time-series model based analysis on an ARIMA model as disclosed herein, and for predicting values for a specified time duration (e.g., the next 30 days).

Figure 9:
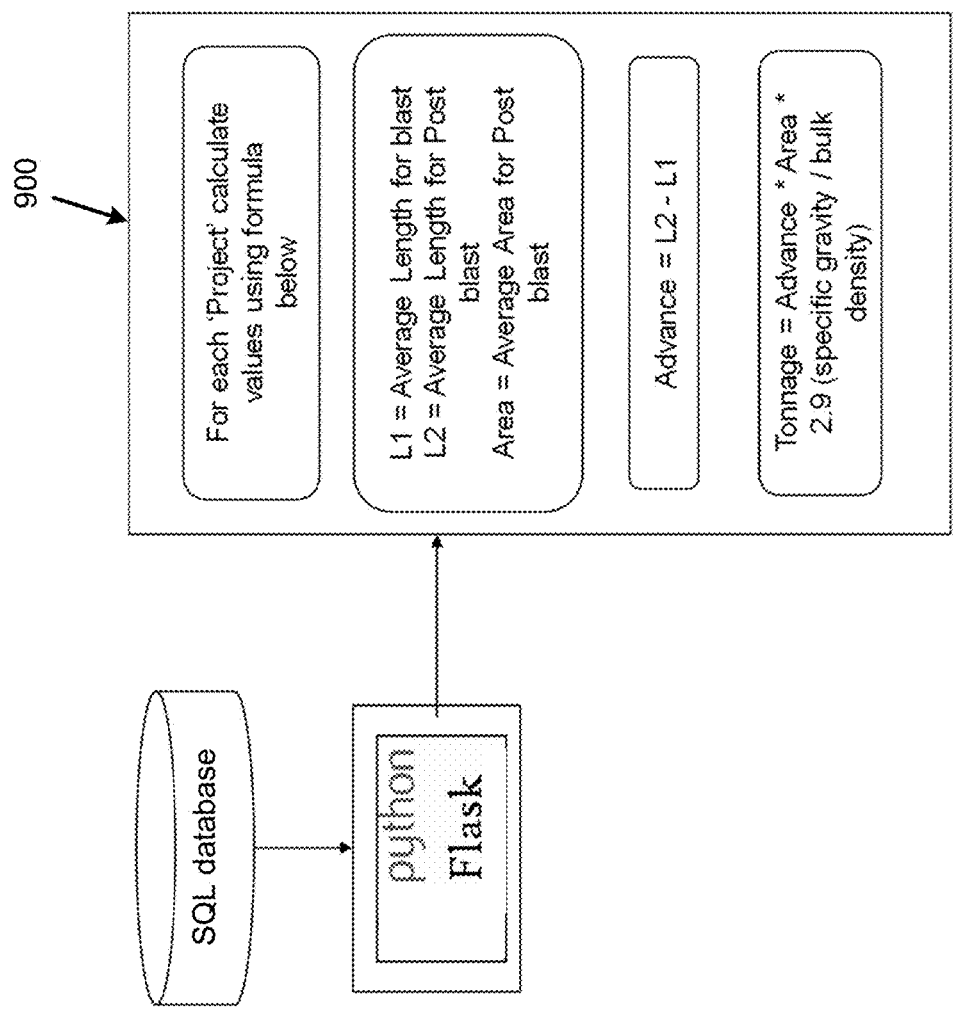
FIG. 9 illustrates further details of tonnage determination to illustrate operation of the system of FIG. 1, according to an example of the present disclosure.

FIG. 9 illustrates further details of tonnage determination to illustrate operation of the system 100, according to an example of the present disclosure.

Referring to FIG. 9, for the example of FIG. 9, the Python FLASK service may utilize NumPy and Pandas to perform calculations on data. For example, NumPy may represent a library that is available to perform mathematical calculations. Pandas may represent a library that is available to perform various operations on data sets.

At 900, for each project, values may be determined using the equations for L1, L2, and area. Further, tonnage may be determined as a function of advance (e.g., L2−L1) multiplied by area and 2.9, which may represent specific gravity divided by bulk density.

For the system 100, machine learning models as disclosed herein may represent time series models that may use both linear and nonlinear datatypes. According to examples disclosed herein, with respect to nonlinear time series models, the time series to be analyzed and forecasted upon may be nonlinear, and may follow no statistical distribution. Examples of nonlinear models may include artificial neural networks, which may utilize multi layer perceptron. The artificial neural network may include a single hidden layer feed forward network, time lagged neural network, and seasonal artificial network. The nonlinear model may also include support vector machines such as least square support vector machine, the dynamic least square support vector machine, etc. With respect to linear models, the time series to be analyzed and forecasted upon may be linear, and may follow a normal distribution. Examples of linear models may include stochastic models such as auto regression, moving average, autoregressive-moving-average (ARMA), etc.

With respect to machine learning implemented by the artificial intelligence and machine learning model implementer 114, AutoRegressive Integrated Moving Average (ARIMA) models may be used to describe the current behavior of variables in terms of linear relationships with their past values. Statistical models utilized by the artificial intelligence and machine learning model implementer 114 may include, for example, Akaike information criterion (AIC), Bayesian information criterion (BIC), and other such models. With respect to Akaike information criterion, this model may represent an estimator of the relative quality of statistical models for a given set of data. Given a collection of models for the data, Akaike information criterion may estimate the quality of each model, relative to each of the other models. Thus, Akaike information criterion may provide a means for model selection. With respect to Bayesian information criterion, the Bayesian information criterion may represent a criterion for model selection among a finite set of models, where the model with the lowest Bayesian information criterion may be preferred. With respect to generation of the blast reconciliation model 120, historic data may be imported into comma-separated values (CSV) and read in Python using a Pandas module to prepare the data for the timeseries model. Akaike information criterion and Bayesian information criterion values may be determined using a stats model ARIMA module and Python for different parameters. The smallest Akaike information criterion and Bayesian information criterion values may be utilized to determine optimal values for PDQ. These parameters may be used to build an ARIMA time series model for the blast reconciliation model 120, and to predict values for a plurality of specified days, such as, the next 30 days.

Figure 10:
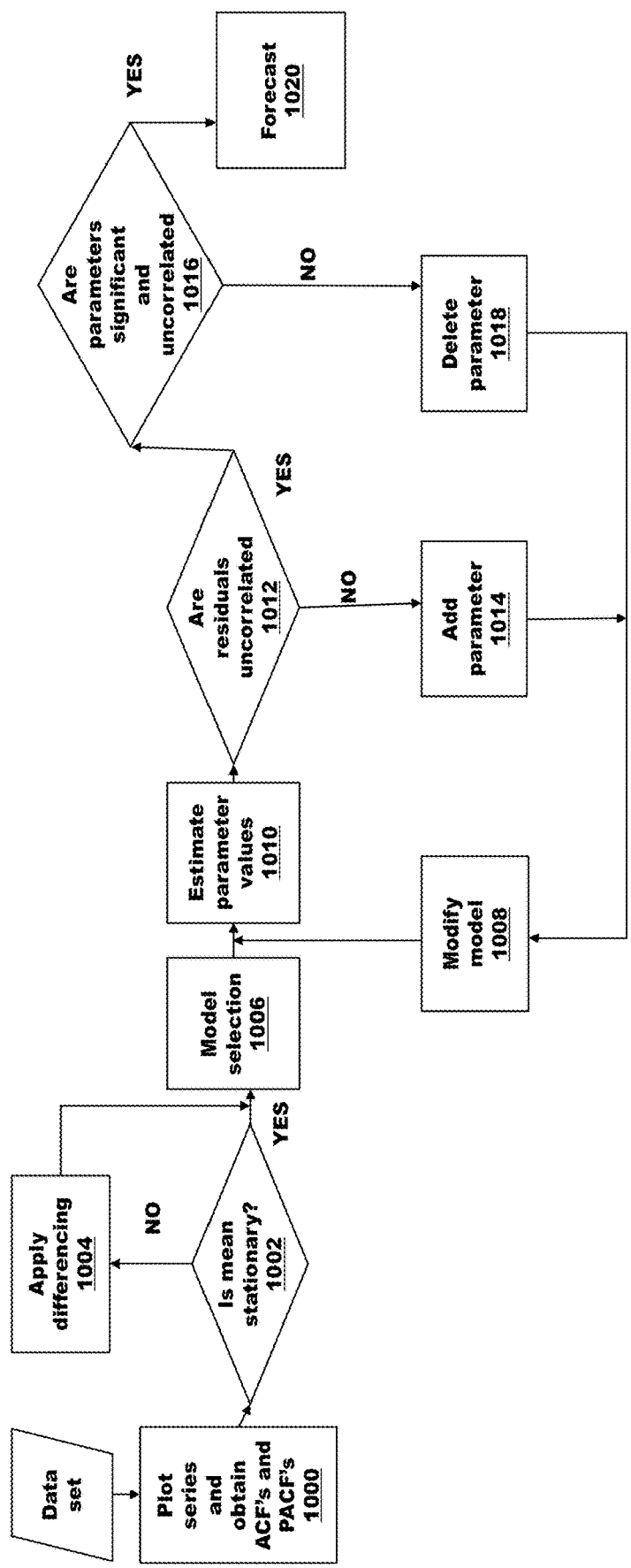
FIG. 10 illustrates details of model selection and forecasting to illustrate operation of the system of FIG. 1, according to an example of the present disclosure.

FIG. 10 illustrates details of model selection and forecasting to illustrate operation of the system 100, according to an example of the present disclosure.

Referring to FIG. 10, with respect to model building, a plurality of iterations may be performed to choose the best model for continuous data ingestion. The process with respect to selection of the best model may be self learning and evolving, to make new predictions by taking into account the changes occurring due to the new data inflow.

At block 1000, the artificial intelligence and machine learning model implementer 114 may utilize the data set (e.g., data including existing pre blast measurement data 116, existing post blast measurement data 118, existing spot values 122, and existing survey values 124 to plot series and determine the autocorrelation function (ACF) and partial autocorrelation function (PACF) to determine parameters. The data set may include both pre-blast and post-blast measurements data, among other historical data values. The autocorrelation function may represent the degree of persistence over respective lags of a variable. The autocorrelation function may be determined as follows:

$$Pk = \gamma k / \gamma o = (\text{covariance at lag } k)/\text{variance} \qquad \text{Equation (1)}$$

For Equation (1), Pk may represent an autocorrelation coefficient with a lag interval k, γk may represent autocovariance with lag k, and γo may represent the variance of the time series.

For Equation (1), with respect to the partial regression coefficient, the lag k partial autocorrelation may represent the partial regression coefficient, θkk in the $k^{th}$ order auto regression. Further:

$$y_t = \theta k1 y_{t-1} + \theta k2 y_{t-2} + \ldots + \theta kk\, y_{t-k} + \varepsilon_t \qquad \text{Equation (2)}$$

For Equation (2), yt may represent the predicted series, and εt may represent the error term involved in the prediction at time t.

At block 1002, the artificial intelligence and machine learning model implementer 114 may determine whether a mean associated with the series, the autocorrelation function, and the partial autocorrelation function determined at block 1000 is stationary. In this regard, the concept of stationarity may state that statistical properties such as mean and variance of a stationary process do not depend upon time, which may represent a condition for building a time series model that is useful for future forecasting. In order to achieve stationary, differencing may be utilized and represent a transformation of the series to a new time series where the values are the differences between consecutive values. For example, regular differencing of first order may be determined as follows:

$$\nabla x_t = x_t - x_{t-1} \qquad \text{Equation (3)}$$

For Equation (3), xt may represent the original time series, xt−1 may represent the lagged series, and ∇xt may represent the backward differenced series.

When utilizing a stationary time series, the autocorrelation function and the partial autocorrelation function may be examined to identify the proper number of lagged y terms and ε terms.

Based on a determination at block 1002 that the mean is not stationary, at block 1004, differencing may be applied to convert nonstationary term series to stationary term series data set. In ARIMA models, the nonstationary time series may be made stationary by applying finite differencing of the data points. The mathematical formulation of the ARIMA (p,d,q) model using log polynomials may be represented as follows:

$$\psi P(L)(1-L)^d y_t = \theta(L)\varepsilon_t, i.e.$$

$$(1-\Sigma_{i=1}^{P} \psi_i L i)(1-L)^d y_t = (1+\Sigma_{j=1}^{q} \theta_j L j)\varepsilon_t \qquad \text{Equation (4)}$$

For Equation (4), ψ may represent parameters, L may represent the lag operator, d may represent the order of differencing, θ may represent parameters, $\varepsilon_t$ may represent the error term, and $y_t$ may represent the predicted series.

Based on a determination at block 1002 that the mean is stationary, at block 1006, the artificial intelligence and machine learning model implementer 114 may analyze the Akaike information criterion (AIC) and Bayesian information criterion (BIC) parameter values to determine the minimum values. The AIC and BIC parameter values may be determined as follows:

$$AIC = n + n\, \log\, 2\pi + n\, \log(RSS/n) + 2(p+1) \qquad \text{Equation (5)}$$

$$BIC = n + n\, \log\, 2\pi + n\, \log(RSS/n) + (\log n)(p+1) \qquad \text{Equation (6)}$$

For Equations (5) and (6), n may represent a total number of observations in the data set, RSS may represent a residual sum of squares, and p may represent a number of parameters for the means.

At block 1008, the artificial intelligence and machine learning model implementer 114 may utilize the smallest AIC and BIC values to determine the optimal values for P,D,Q to build the blast reconciliation model 120. In this regard, P,D,Q may include integers greater than or equal to zero, and refer to the order of the autoregressive, integrated, and moving average parts of the blast reconciliation model 120 respectively. The integer d may control the level of differencing. Generally d may be set to one. When d is set to zero, then the blast reconciliation model 120 may reduce to an ARMA(p,q) model. An ARIMA (p,0,0) may represent the AR(p) model, and ARIMA(0,0,q) may represent the MA(q) model. ARIMA (0,1,0) (i.e., yt=yt−1+εt) may be described as a random walk model, and may be used for non-stationary data.

At block 1010, the artificial intelligence and machine learning model implementer 114 may generate the ARIMA model component of the blast reconciliation model 120 using AutoRegression (AR), and Moving Averages (MA) as follows:

$$AR(p): y_t = c + \sum_{i=1}^{p} \varphi_i y_{t\_i} + \varepsilon_t = c + \varphi_1 y_{t-1} + \varphi_2 y_{t-2} + \ldots + \varphi_p y_{t-p} + \varepsilon_t$$
Equation (7)

$$MA(q): y_t = \mu + \sum_{j=1}^{q} \theta_j \varepsilon_{t\_j} + \varepsilon_t = \mu + \varepsilon_t - \theta_1 \varepsilon_{t-1} - \theta_2 \varepsilon_{t-2} - \ldots - \theta_q \varepsilon_{t-q}$$
Equation (8)

$$ARMA(p,q): y_t = c + \varepsilon_t + \sum_{i=1}^{p} \varphi_i y_{t\_i} + \sum_{j=1}^{q} \theta_j \varepsilon_{t\_j}$$
$$= c + \varphi_1 y_{t-1} + \varphi_2 y_{t-2} + \ldots + \varphi p y_{t-p} + \varepsilon_t - \theta_1 \varepsilon_{t-1} - \theta_2 \varepsilon_{t-2} - \ldots - \theta_q \varepsilon_{t-q}$$
Equation (9)

For Equations (7)-(9), $y_t$ may represent the predicted series, c may represent the intercept or constant term, and φ may represent the coefficients/parameters in the final cumulative Equation (9), μ may be incorporated here into the constant value, $\varepsilon_t$ may represent the error term, and ψ may represent parameters.

At block 1012, the artificial intelligence and machine learning model implementer 114 may determine whether residuals are uncorrelated.

Based on a determination at block 1012 that the residuals are not uncorrelated, at block 1014, the artificial intelligence and machine learning model implementer 114 may add a parameter. Adding a parameter may facilitate increase of the accuracy and prediction functionality of the model.

At block 1016, the artificial intelligence and machine learning model implementer 114 may determine whether the ARMA model parameters are significant and uncorrelated. If the ARMA model parameters are uncorrelated and significant, then the accuracy of the model increases. In this regard, ARMA models may be manipulated using the lag operator notation. The lag of backshift operator may be defined as Ly t=yt−1, where yt is the original series, t is the time, and Lyt is the lag or backshift operator. Polynomials of lag operator or lag polynomials may be used to represent the ARMA model as follows:

$$AR(p) \text{model}: \varepsilon_t = \varphi(L) y_t$$
Equation (10)

$$MA(q) \text{model}: y_t = \theta(L) \varepsilon_t$$
Equation (11)

$$ARMA(p,q) \text{model}: \varphi(L) y_t = \theta(L) \varepsilon_t$$
Equation (12)

where: $\varphi(L) = \Sigma_{i=1}^{p} \varphi_i L_i \ \theta(L) = 1 + \Sigma_{i=1}^{p} \theta_i L_j$
Equation (13)

Based on a determination at block 1016 that the parameters are not significant and/or are not uncorrelated, at block 1018, the artificial intelligence and machine learning model implementer 114 may delete the parameter. Deleting a parameter may increase the accuracy and prediction functionality of the model.

The artificial intelligence and machine learning model implementer 114 may iterate and finalize to determine the optimum model for parameter selection. An optimum model may be where AIC and BIC values are minimum. This will ensure minimum information loss and maximum theoretical explainability of the predictions. With respect to parameter estimation, the artificial intelligence and machine learning model implementer 114 may estimate the coefficients using least squares, and minimize the sum of squares of deviations as follows:

$$\text{Min } \Sigma_{n=t}^{\infty} (\varepsilon_t)^2$$
Equation (14)

$$\text{Min } \Sigma_{t=2}^{T} (y_t - \varphi y_{t-1})^2$$
Equation (15)

At block 1020, the artificial intelligence and machine learning model implementer 114 may forecast the blast material yield 126 by performing a customized implementation with the ARIMA model. In this regard, the artificial intelligence and machine learning model implementer 114 may execute the aforementioned steps with respect to blocks 1000-1020, where Equation (16) and Equation (17) that are implemented below may represent a customized implementation of the ARIMA machine learning model of the blast reconciliation model 120. For example, Equation (16) and Equation (17) may represent a unique interpretation that is specific to this use-case. This may allow historical data to be leveraged for learning and building the blast reconciliation model 120 that leads to accurate and precise forecasts/predictions. The functions may be represented as follows:

$$AIC\{f(ARIMA)\}, \text{ for}(p_n, d_n, q_n, \text{ where } n \rightarrow [0,50])$$
(19600 possible combinations)
Equation (16)

$$BIC\{f(ARIMA)\}, \text{ for}(p_n, d_n, q_n, \text{ where } n \rightarrow [0,50])$$
(19600 possible combinations)
Equation (17)

Equation (16) and Equation (17) may be used to select the model where both AIC and BIC values are minimum (e.g., out of any 384 million combinations). With respect to Equation (16) and Equation (17), the AIC value for the ARIMA models may be built on the basis of passing different p, d, and q values. Here the n→[0,50] may represent the number of iterations a for loop will run, to calculate all the corresponding values of AIC. This results in 50C3 (total combinations of AIC values) due to possible combinations. Similarly BIC may also be determined, and then the point where both these values are minimum that model may be used for prediction. Since both these parameters need to converge to minimum on the same p, d, q values, the total number of possible combinations become (50C3)*(50C3), which turns out to be a selection made from a total of 384 million possible combinations. For Equation (16) and Equation (17), p may represent the number of lag observations included in the model, also called the lag order, d may represent the number of times that the raw observations are differenced, also called the degree of differencing, and q may represent the size of the moving average window, also called the order of moving average.

Figure 11:
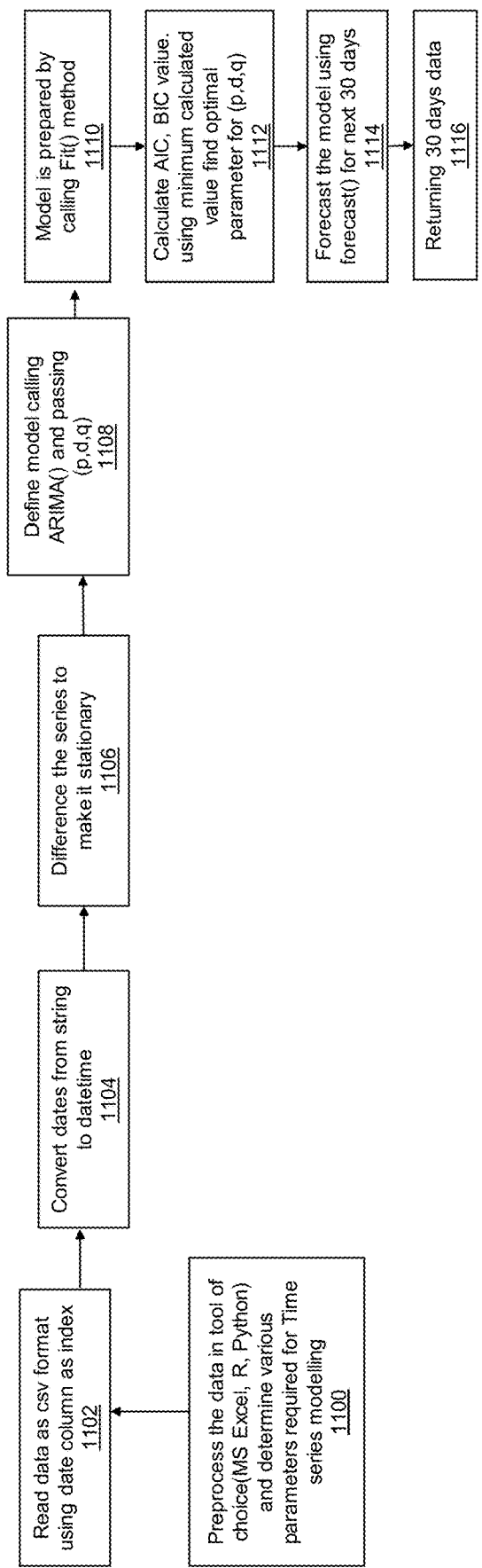
FIG. 11 illustrates details of model building to illustrate operation of the system of FIG. 1, according to an example of the present disclosure.

FIG. 11 illustrates details of model building to illustrate operation of the system 100, according to an example of the present disclosure;

Referring to FIG. 11, the artificial intelligence and machine learning model implementer 114 may build the ARIMA model for the blast reconciliation model 120 starting at block 1100 by preprocessing data using tools such as MICROSOFT EXCEL, R, PYTHON, etc., to determine various parameters needed for timeseries modeling.

At block 1102, the artificial intelligence and machine learning model implementer 114 may read the preprocessed data using a comma-separated values (CSV) format using, for example, a date column as an index.

At block 1104, the artificial intelligence and machine learning model implementer 114 may convert dates from string to datetime.

At block 1106, the artificial intelligence and machine learning model implementer 114 may determine a difference for the series to make the series stationary. In this regard, stationarity may be determined by differencing the lag series of the original data.

At block 1108, the artificial intelligence and machine learning model implementer 114 may define the blast reconciliation model 120 by calling ARIMA( ) and passing (p,d,q), where ARIMA( ) may represent a function of a Python package (statsmodels), and may be invoked to build ARIMA time series models.

At block 1110, the artificial intelligence and machine learning model implementer 114 may prepare the blast reconciliation model by calling the fit( ) method, where the fit( ) method in the ARIMA( ) function within the statsmodels package in Python may be used to fit data to represent on a curve.

At block 1112, the artificial intelligence and machine learning model implementer 114 may determine AIC, and BIC values. Further, using the minimum determined AIC, and BIC values, the artificial intelligence and machine learning model implementer 114 may determine the optimal parameter for (p,d,q).

At block 1114, the artificial intelligence and machine learning model implementer 114 may forecast the blast material yield 126 for the blast reconciliation model 120 using forecast( ) for a specified time duration (e.g., the next 30 days). In order to train the artificial intelligence and machine learning model, real historical data may be used to forecast effectively.

At block 1116, the artificial intelligence and machine learning model implementer 114 may return data that may include the blast material yield 126 for the specified time duration.

Figure 12:
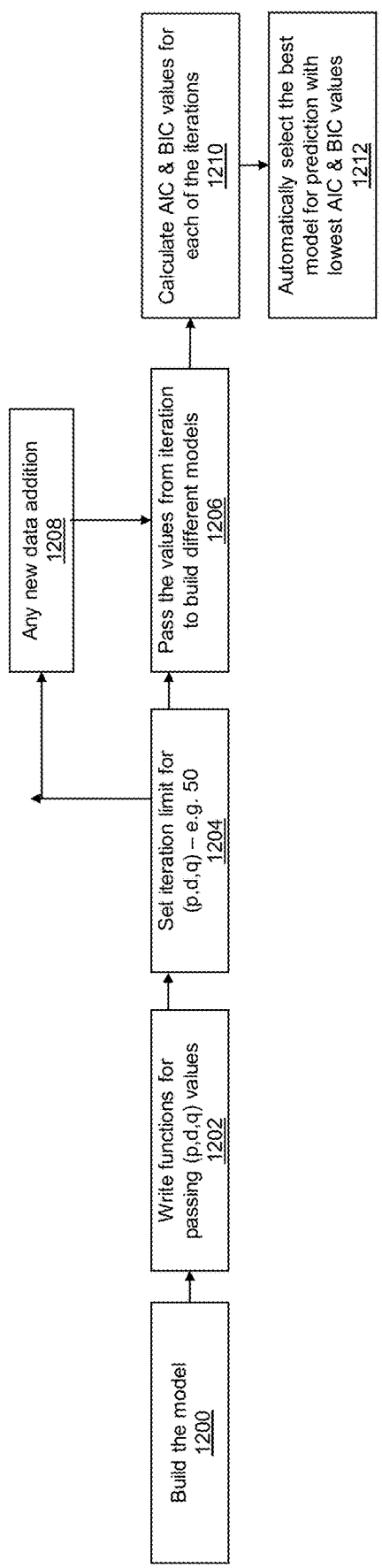
FIG. 12 illustrates details of self learning to illustrate operation of the system of FIG. 1, according to an example of the present disclosure.

FIG. 12 illustrates details of self learning to illustrate operation of the system 100, according to an example of the present disclosure.

Referring to FIG. 12, with respect to self learning, at block 1200, the artificial intelligence and machine learning model implementer 114 may build the blast reconciliation model 120 as disclosed herein with respect to FIG. 11.

At block 1202, the artificial intelligence and machine learning model implementer 114 may write functions for passing (p,d,q) values. This function may be implemented in the Python programming language as an iterated sequence, which will invoke itself repeatedly, with each run having different values of p, d, and q.

At block 1204, the artificial intelligence and machine learning model implementer 114 may set an iteration limit for (p,d,q). For example, the iteration limit may be set to 50.

At block 1206, the artificial intelligence and machine learning model implementer 114 may pass the values from the iteration to build different models with respect to the blast reconciliation model 120, where these models may be time series models. The time series may be different each time, because with every run, a new set of p, d, and q values may be passed to determine AIC and BIC values.

At block 1208, the artificial intelligence and machine learning model implementer 114 may incorporate any new data addition with respect to the building of different models at block 1206.

At block 1210, the artificial intelligence and machine learning model implementer 114 may determine AIC and BIC values for each of the iterations.

At block 1212, the artificial intelligence and machine learning model implementer 114 may determine the model with the lowest AIC and BIC values.

Figure 13:
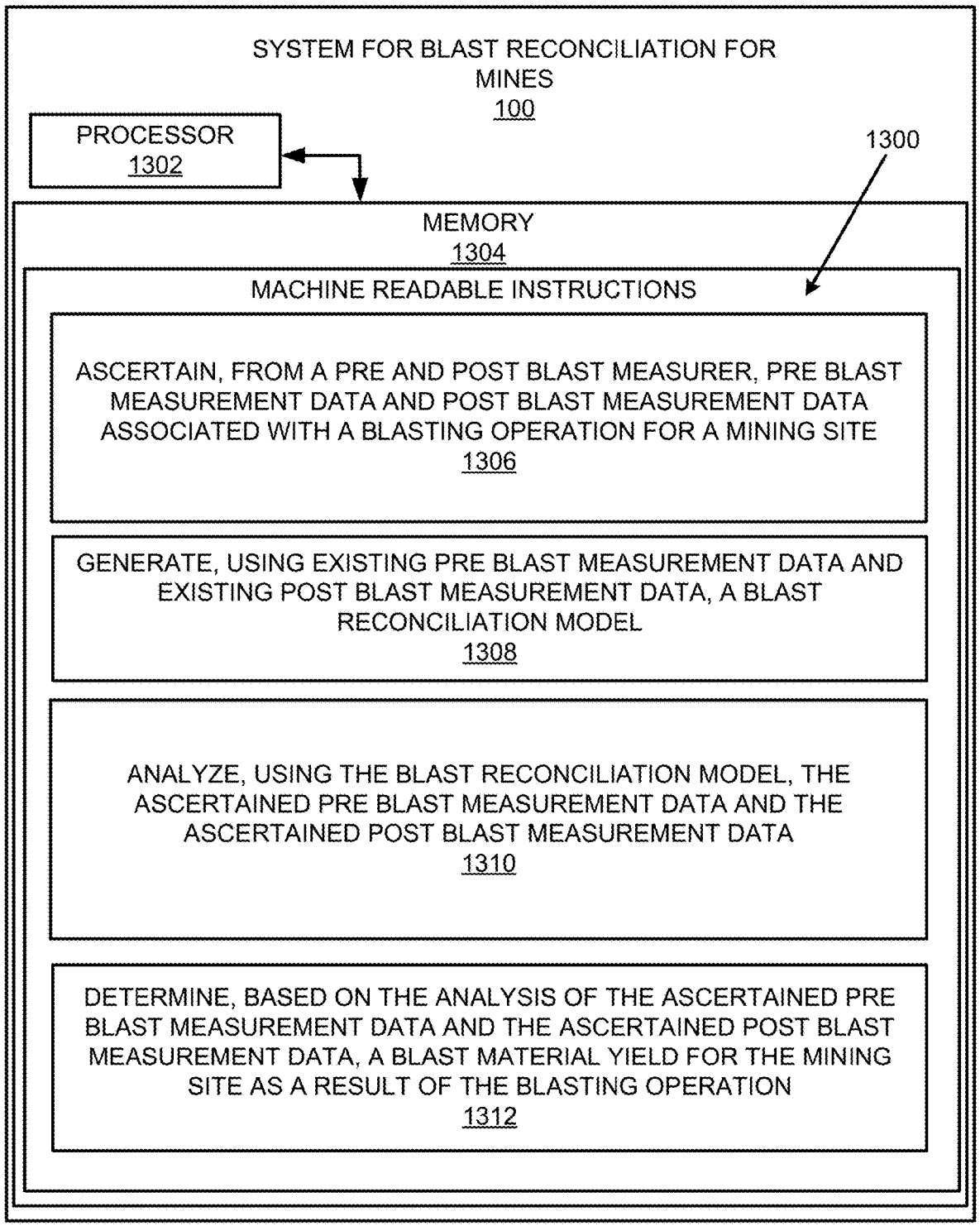
FIG. 13 illustrates a block diagram for blast reconciliation for mines, according to an example of the present disclosure.
Figure 13:
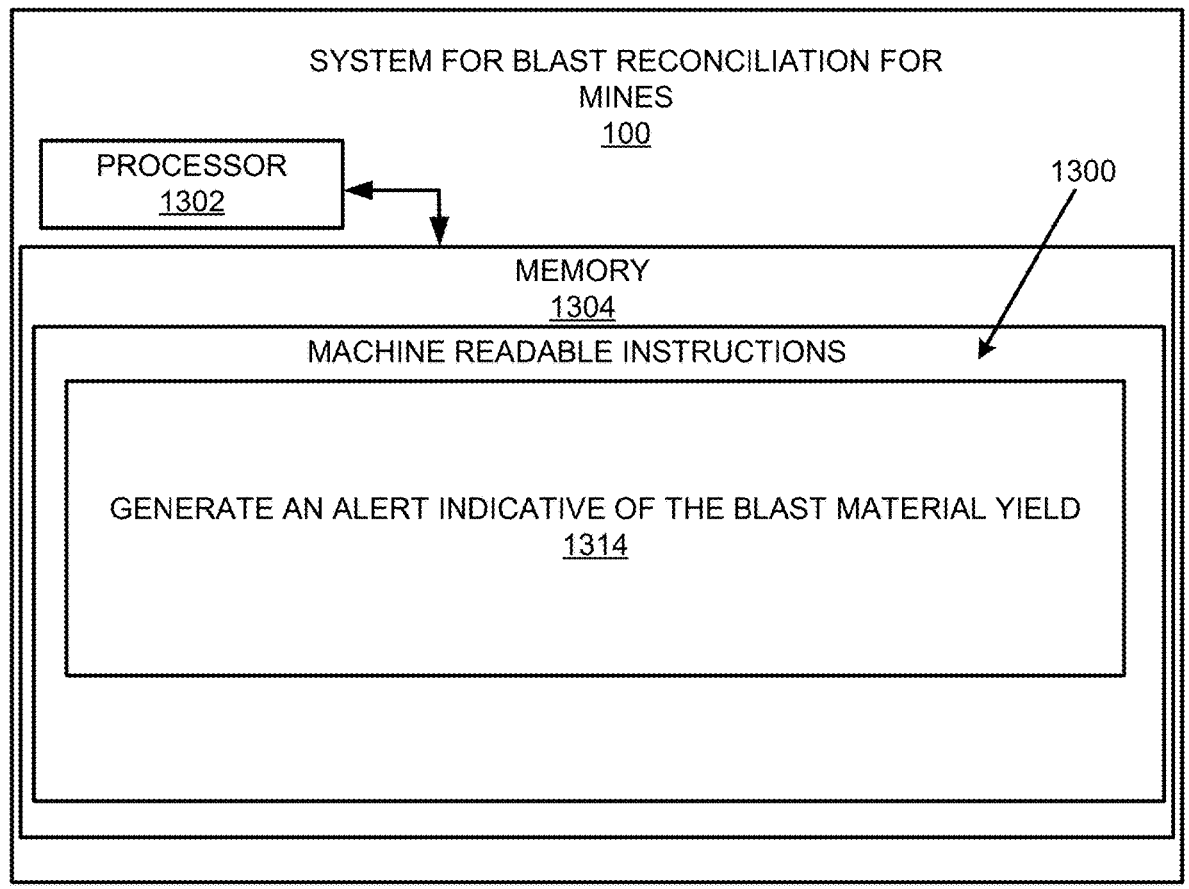
Figure 15:
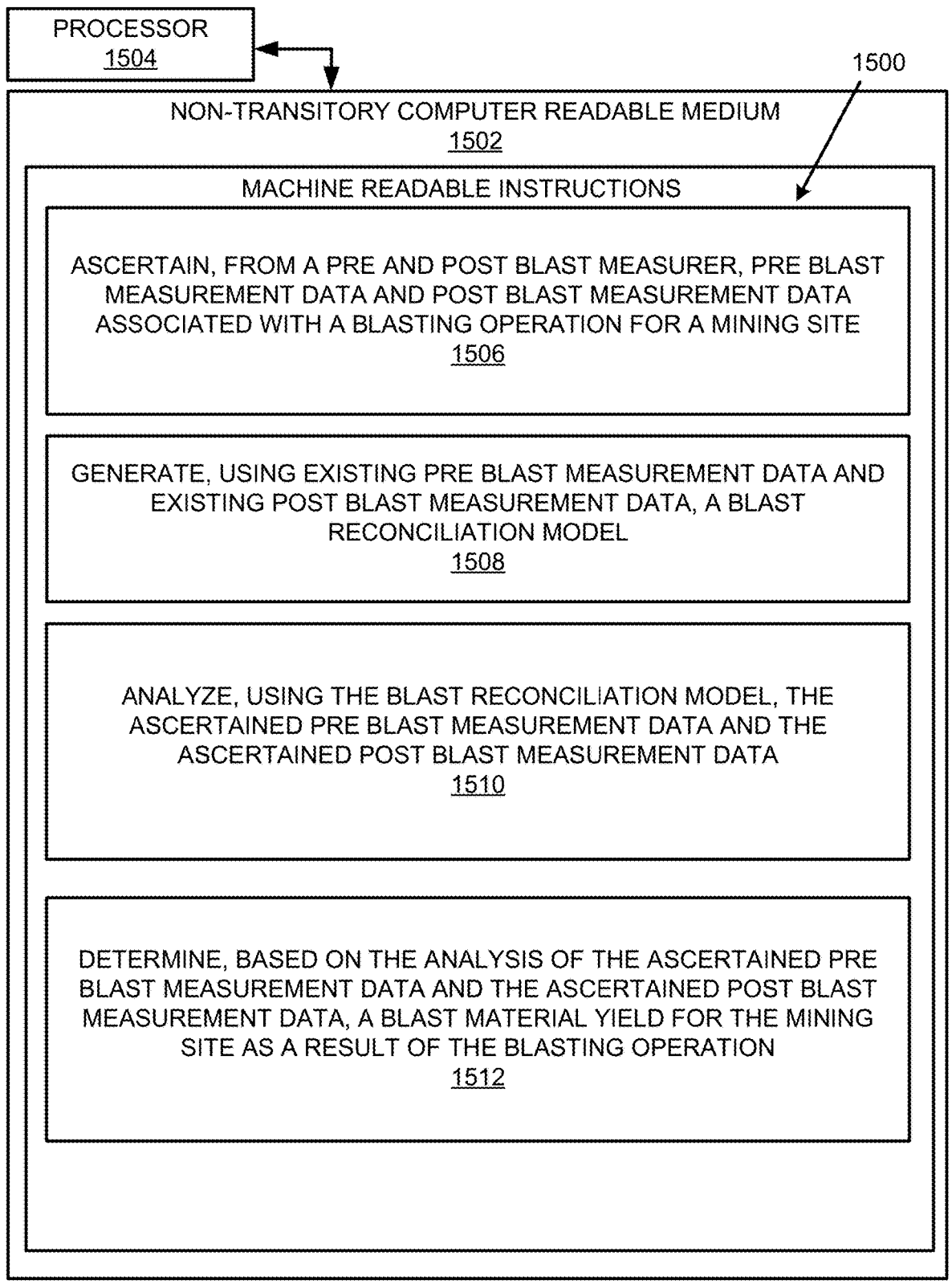
FIG. 15 illustrates a further block diagram for blast reconciliation for mines, according to an example of the present disclosure.
Figure 15:
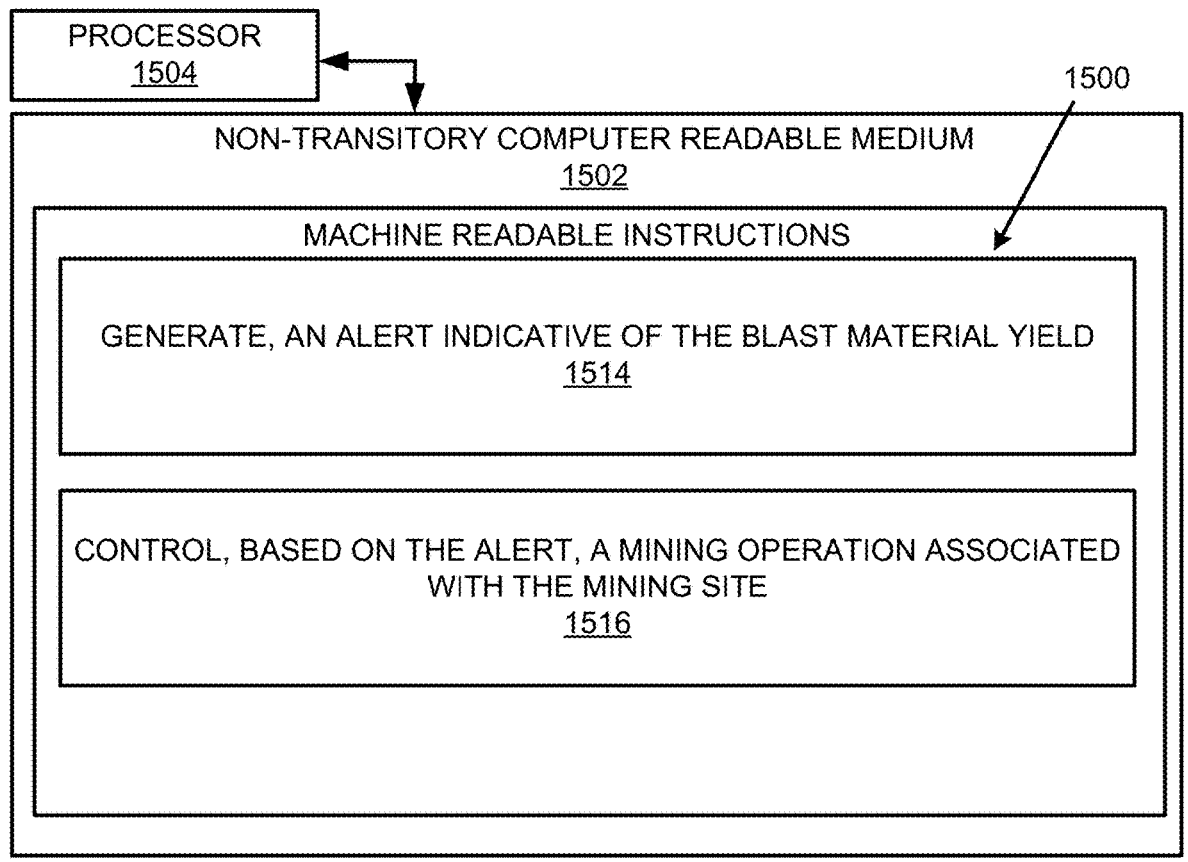

FIGS. 13-15 respectively illustrate a block diagram 1300, a flowchart of a method 1400, and a further block diagram 1500 for blast reconciliation for mines, according to examples. The block diagram 1300, the method 1400, and the block diagram 1500 may be implemented on the system 100 described above with reference to FIG. 1 by way of example and not limitation. The block diagram 1300, the method 1400, and the block diagram 1500 may be practiced in other systems. In addition to showing the block diagram 1300, FIG. 13 shows hardware of the system 100 that may execute the instructions of the block diagram 1300. The hardware may include a processor 1302, and a memory 1304 storing machine readable instructions that when executed by the processor cause the processor to perform the instructions of the block diagram 1300. The memory 1304 may represent a non-transitory computer readable medium. FIG. 14 may represent a method for blast reconciliation for mines, and the steps of the method. FIG. 15 may represent a non-transitory computer readable medium 1502 having stored thereon machine readable instructions to provide a blast reconciliation for mines. The machine readable instructions, when executed, cause a processor 1504 to perform the instructions of the block diagram 1500 also shown in FIG. 15.

The processor 1302 of FIG. 13 and/or the processor 1504 of FIG. 15 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1502 of FIG. 15), such as hardware storage devices (e.g., RAM (random access memory), ROM (read only memory), EPROM (erasable, programmable ROM), EEPROM (electrically erasable, programmable ROM), hard drives, and flash memory). The memory 1304 may include a RAM, where the machine readable instructions and data for a processor may reside during runtime.

Referring to FIGS. 1-13, and particularly to the block diagram 1300 shown in FIG. 13, the memory 1304 may include instructions 1306 to ascertain, from a pre and post blast measurer 104, pre blast measurement data 106 and post blast measurement data 108 associated with a blasting operation 110 for a mining site 112.

The processor 1302 may fetch, decode, and execute the instructions 1308 to generate, using existing pre blast measurement data 116 and existing post blast measurement data 118, a blast reconciliation model 120.

The processor 1302 may fetch, decode, and execute the instructions 1310 to analyze, using the blast reconciliation model 120, the ascertained pre blast measurement data 106 and the ascertained post blast measurement data 108.

The processor 1302 may fetch, decode, and execute the instructions 1312 to determine, based on the analysis of the ascertained pre blast measurement data and the ascertained post blast measurement data, a blast material yield 126 for the mining site 112 as a result of the blasting operation 110.

The processor 1302 may fetch, decode, and execute the instructions 1314 to generate an alert 130 indicative of the blast material yield 126.

Referring to FIGS. 1-12 and 14, and particularly FIG. 14, for the method 1400, at block 1402, the method may include ascertaining, by at least one processor, from a pre and post blast measurer 104, pre blast measurement data 106 and post blast measurement data 108 associated with a blasting operation 110 for a mining site 112.

At block 1404, the method may include generating, by the at least one processor, using existing pre blast measurement data 116 and existing post blast measurement data 118, a blast reconciliation model 120.

At block 1406, the method may include analyzing, by the at least one processor, using the blast reconciliation model 120, the ascertained pre blast measurement data 106 and the ascertained post blast measurement data 108.

At block 1408, the method may include determining, by the at least one processor, based on the analysis of the ascertained pre blast measurement data 106 and the ascertained post blast measurement data 108, a blast material yield 126 for the mining site 112 as a result of the blasting operation 110.

At block 1410, the method may include generating, by the at least one processor, an alert 130 indicative of the blast material yield 126.

At block 1412, the method may include controlling, by the at least one processor, based on the alert 130, a mining operation 134 associated with the mining site 112.

Referring to FIGS. 1-12 and 15, and particularly FIG. 15, for the block diagram 1500, the non-transitory computer readable medium 1502 may include instructions 1506 to ascertain, from a pre and post blast measurer 104, pre blast measurement data 106 and post blast measurement data 108 associated with a blasting operation 110 for a mining site 112. The pre and post blast measurer 104 may include a laser device to ascertain the pre blast measurement data that includes a pre blast length measurement from a reference location of the mining site 112 to a surface of the mining site 112 prior to commencement of the blasting operation 110, and the post blast measurement data that includes a post blast length measurement from the reference location of the mining site 112 to another surface of the mining site 112 after completion of the blasting operation 110, and a blast area associated with the other surface of the mining site 112 after the completion of the blasting operation 110.

The processor 1504 may fetch, decode, and execute the instructions 1508 to generate, using existing pre blast measurement data 116 and existing post blast measurement data 118, a blast reconciliation model 120.

The processor 1504 may fetch, decode, and execute the instructions 1510 to analyze, using the blast reconciliation model 120, the ascertained pre blast measurement data 106 and the ascertained post blast measurement data 108.

The processor 1504 may fetch, decode, and execute the instructions 1512 to determine, based on the analysis of the ascertained pre blast measurement data 106 and the ascertained post blast measurement data 108, a blast material yield 126 for the mining site 112 as a result of the blasting operation 110.

The processor 1504 may fetch, decode, and execute the instructions 1514 to generate, an alert 130 indicative of the blast material yield 126.

The processor 1504 may fetch, decode, and execute the instructions 1516 to control, based on the alert 130, a mining operation 134 associated with the mining site 112.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A system comprising:
   a blast analyzer, executed by at least one hardware processor, to
     ascertain, from a pre and post blast measurer, pre blast measurement data and post blast measurement data associated with a blasting operation for a mining site;
   an artificial intelligence and machine learning model implementer, executed by the at least one hardware processor, to
     generate, using existing pre blast measurement data and existing post blast measurement data, a blast reconciliation model by generating, using existing spot values determined by counting a number of vehicles or containers that are used to remove raw material associated with blasting operations for a specified time duration, existing survey values associated with the blasting operations for the specified time duration, the existing pre blast measurement data associated with the blasting operations for the specified time duration, and the existing post blast measurement data associated with the blasting operations for the specified time duration, the blast reconciliation model,
     analyze, using the blast reconciliation model, the ascertained pre blast measurement data and the ascertained post blast measurement data, and
     determine, based on the analysis of the ascertained pre blast measurement data and the ascertained post blast measurement data, a blast material yield for the mining site as a result of the blasting operation; and
   an alert generator, executed by the at least one hardware processor, to
     generate an alert indicative of the blast material yield.

2. The system according to claim 1, further comprising:
   a mining operation controller, executed by the at least one hardware processor, to control, based on the alert, a mining operation associated with the mining site.

3. The system according to claim 1, wherein the pre and post blast measurer comprises a laser device to ascertain
   the pre blast measurement data that includes a pre blast length measurement from a reference location of the mining site to a surface of the mining site prior to commencement of the blasting operation; and
   the post blast measurement data that includes
     a post blast length measurement from the reference location of the mining site to another surface of the mining site after completion of the blasting operation, and
     a blast area associated with the other surface of the mining site after the completion of the blasting operation.

4. The system according to claim 1, wherein the blast analyzer is executed by the at least one hardware processor, to ascertain, from the pre and post blast measurer, the pre blast measurement data and the post blast measurement data associated with the blasting operation for the mining site by:
ascertaining, from a Cloud database that is to receive the pre blast measurement data and the post blast measurement data from the pre and post blast measurer, the pre blast measurement data and the post blast measurement data associated with the blasting operation for the mining site.

5. The system according to claim 1, wherein the artificial intelligence and machine learning model implementer that is executed by the at least one hardware processor is to generate, using the existing pre blast measurement data and the existing post blast measurement data, the blast reconciliation model by:
implementing the blast reconciliation model utilizing artificial intelligence and machine learning; and
utilizing the artificial intelligence and the machine learning of the blast reconciliation model to analyze the existing pre blast measurement data and the existing post blast measurement data.

6. The system according to claim 1, wherein the artificial intelligence and machine learning model implementer that is executed by the at least one hardware processor is to analyze, using the blast reconciliation model, the ascertained pre blast measurement data and the ascertained post blast measurement data by:
tuning the blast reconciliation model; and
determining a fit of the ascertained pre blast measurement data and the ascertained post blast measurement data to the tuned blast reconciliation model.

7. The system according to claim 1, wherein the artificial intelligence and machine learning model implementer is executed by the at least one hardware processor, to generate, using the existing pre blast measurement data and the existing post blast measurement data, the blast reconciliation model by:
utilizing, for the blast reconciliation model, a time series model to predict a production output value for blast material for a specified future date.

8. The system according to claim 7, wherein the artificial intelligence and machine learning model implementer is executed by the at least one hardware processor, to utilize, for the blast reconciliation model, the time series model to predict the production output value for blast material for the specified future date by:
utilizing, for the blast reconciliation model, a linear time series model;
determining, for the linear time series model, Akaike information criterion (AIC) values and Bayesian information criterion (BIC) values;
identifying, from the determined AIC and BIC values, smallest AIC and BIC values; and
utilizing the determined smallest AIC and BIC values to predict the production output value for blast material for the specified future date.

9. The system according to claim 1, wherein the artificial intelligence and machine learning model implementer is executed by the at least one hardware processor, to generate, using the existing pre blast measurement data and the existing post blast measurement data, the blast reconciliation model by:
determining, for the blast reconciliation model, a variance between predicted and observed production output values for blast material.

10. A computer implemented method comprising:
ascertaining, by at least one processor, from a pre and post blast measurer, pre blast measurement data and post blast measurement data associated with a blasting operation for a mining site;
generating, by the at least one processor, using existing pre blast measurement data and existing post blast measurement data, a blast reconciliation model by generating, using existing spot values determined by counting a number of vehicles or containers that are used to remove raw material associated with blasting operations for a specified time duration, existing survey values associated with the blasting operations for the specified time duration, the existing pre blast measurement data associated with the blasting, operations for the specified time duration, and the existing post blast measurement data associated with the blasting operations for the specified time duration, the blast reconciliation model;
analyzing, by the at least one processor, using the blast reconciliation model, the ascertained pre blast measurement data and the ascertained post blast measurement data;
determining, by the at least one processor, based on the analysis of the ascertained pre blast measurement data and the ascertained post blast measurement data, a blast material yield for the mining site as a result of the blasting operation;
generating, by the at least one processor, an alert indicative of the blast material yield; and
controlling, by the at least one processor, based on the alert, a mining operation associated with the mining site.

11. The method according to claim 10, wherein the pre and post blast measurer comprises a laser device, further comprising:
ascertaining, by the laser device, the pre blast measurement data that includes a pre blast length measurement from a reference location of the mining site to a surface of the mining site prior to commencement of the blasting operation; and
ascertaining, by the laser device, the post blast measurement data that includes
a post blast length measurement from the reference location of the mining site to another surface of the mining site after completion of the blasting operation, and
a blast area associated with the other surface of the mining site after the completion of the blasting operation.

12. The method according to claim 10, wherein ascertaining, from the pre and post blast measurer, the pre blast measurement data and the post blast measurement data associated with the blasting operation for the mining site further comprises:
ascertaining, from a Cloud database that is to receive the pre blast measurement data and the post blast measurement data from the pre and post blast measurer, the pre blast measurement data and the post blast measurement data associated with the blasting operation for the mining site.

13. The method according to claim 10, wherein generating, using the existing pre blast measurement data and the existing post blast measurement data, the blast reconciliation model further comprises:
implementing the blast reconciliation model utilizing artificial intelligence and machine learning; and
utilizing the artificial intelligence and the machine learning of the blast reconciliation model to analyze the existing pre blast measurement data and the existing post blast measurement data.

14. A non-transitory computer readable medium having stored thereon machine readable instructions, the machine readable instructions, when executed, cause at least one hardware processor to:

ascertain, from a pre and post blast measurer, pre blast measurement data and post blast measurement data associated with a blasting operation for a mining site, wherein the pre and post blast measurer comprises a laser device to ascertain the pre blast measurement data that includes a pre blast length measurement from a reference location of the mining site to a surface of the mining site prior to commencement of the blasting operation, and the post blast measurement data that includes a post blast length measurement from the reference location of the mining site to another surface of the mining site after completion of the blasting operation, and a blast area associated with the other surface of the mining site after the completion of the blasting operation;

generate, using existing pre blast measurement data and existing post blast measurement data, a blast reconciliation model by generating, using existing spot values determined by counting a number of vehicles or containers that are used to remove raw material associated with blasting operations for a specified time duration, existing survey values associated with the blasting operations for the specified time duration, the existing pre blast measurement data associated with the blasting operations for the specified time duration, and the existing post blast measurement data associated with the blasting operations for the specified time duration, the blast reconciliation model;

analyze, using the blast reconciliation model, the ascertained pre blast measurement data and the ascertained post blast measurement data;

determine, based on the analysis of the ascertained pre blast measurement data and the ascertained post blast measurement data, a blast material yield for the mining site as a result of the blasting operation;

generate, an alert indicative of the blast material yield; and control, based on the alert, a mining operation associated with the mining site.

15. The non-transitory computer readable medium according to claim 14, wherein the machine readable instructions to analyze, using the blast reconciliation model, the ascertained pre blast measurement data and the ascertained post blast measurement data, when executed by the at least one hardware processor, further cause the at least one hardware processor to:

tune the blast reconciliation model; and determine a fit of the ascertained pre blast measurement data and the ascertained post blast measurement data to the tuned blast reconciliation model.

16. The non-transitory computer readable medium according to claim 14, wherein the machine readable instructions to generate, using the existing pre blast measurement data and the existing post blast measurement data, the blast reconciliation model, when executed by the at least one hardware processor, further cause the at least one hardware processor to:

utilize, for the blast reconciliation model, a time series model to predict a production output value for blast material for a specified future date.

17. The non-transitory computer readable medium according to claim 16, wherein the machine readable instructions to utilize, for the blast reconciliation model, the time series model to predict the production output value for blast material for the specified future date, when executed by the at least one hardware processor, further cause the at least one hardware processor to:

utilize, for the blast reconciliation model, a linear time series model;

determine, for the linear time series model, Akaike information criterion (AIC) values and Bayesian information criterion (BIC) values;

identify, from the determined AIC and BIC values, smallest AIC and BIC values; and utilize the determined smallest AIC and BIC values to predict the production output value for blast material for the specified future date.

18. The non-transitory computer readable medium according to claim 14, wherein the machine readable instructions to generate, using the existing pre blast measurement data and the existing post blast measurement data, the blast reconciliation model, when executed by the at least one hardware processor, further cause the at least one hardware processor to:

determine, for the blast reconciliation model, a variance between predicted and observed production output values for blast material.

* * * * *